United States Patent
Okamoto et al.

(10) Patent No.: US 11,055,571 B2
(45) Date of Patent: Jul. 6, 2021

(54) INFORMATION PROCESSING DEVICE, RECORDING MEDIUM RECORDING INFORMATION PROCESSING PROGRAM, AND INFORMATION PROCESSING METHOD

(71) Applicant: FUJITSU LIMITED, Kawasaki (JP)

(72) Inventors: Hiroaki Okamoto, Atsugi (JP); Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 16/717,388

(22) Filed: Dec. 17, 2019

(65) Prior Publication Data
US 2020/0125889 A1   Apr. 23, 2020

Related U.S. Application Data

(63) Continuation of application No. PCT/JP2017/027633, filed on Jul. 31, 2017.

(51) Int. Cl.
G06K 9/00    (2006.01)
G06K 9/62    (2006.01)

(52) U.S. Cl.
CPC ........... *G06K 9/626* (2013.01); *G06K 9/6269* (2013.01)

(58) Field of Classification Search
CPC ........ G06K 9/626; G06K 9/6269; G06K 9/48; G06K 9/4609; G06K 9/6407;
(Continued)

(56) References Cited

U.S. PATENT DOCUMENTS 4,428,077 A * 1/1984 Shimada ............... G06K 9/48
382/173
5,485,531 A * 1/1996 Ichinohe ............ G06K 9/4609
382/198

(Continued)

FOREIGN PATENT DOCUMENTS

JP    2004-239870 A    8/2004
JP    2006-260410 A    9/2006

(Continued)

OTHER PUBLICATIONS

International Search Report and Written Opinion of the International Searching Authority (Form PCT/ISA/210, 220, and 237), mailed in connection with PCT Application No. PCT/JP2017/027633 dated Aug. 29, 2017, 10 pages.

(Continued)

*Primary Examiner* — Amir Alavi
(74) *Attorney, Agent, or Firm* — Fujitsu Patent Center

(57) ABSTRACT

An information processing device includes: a memory; and a processor coupled to the memory and configured to: accept specification of a feature region that includes a characteristic portion in a learning image; create first data that indicates a degree of overlap between the feature region and each of divided regions obtained by dividing the learning image; perform image conversion on the learning image by an image classification program in which element filters are combined; calculate an image feature value of each of the divided regions from an image obtained; create second data that indicates the image feature value corresponding to each of the divided regions; calculate a similarity between the first data and the second data; and use a result of evaluating the image classification program on the basis of the similarity, for execution of a genetic programming.

17 Claims, 23 Drawing Sheets

(58) Field of Classification Search
CPC ............... G06K 9/6423; G06K 9/6476; G06K
9/00084; G06K 9/00718; G06K 9/00797;
G06T 7/0083; G06T 2207/10016; G11B
27/28; G06F 17/30249; G06F 17/30257;
H04N 1/40062
See application file for complete search history.

(56) References Cited

U.S. PATENT DOCUMENTS

| | | | |
|---|---|---|---|
| 5,640,466 A * | 6/1997 | Huttenlocher | G06K 9/00 382/177 |
| 7,167,587 B2 * | 1/2007 | Ii | G06K 9/685 382/228 |
| 7,502,547 B2 * | 3/2009 | Abe | G11B 27/105 348/465 |
| 7,664,376 B2 * | 2/2010 | Murabayashi | G11B 27/105 386/216 |
| 7,668,376 B2 * | 2/2010 | Lin | G06K 9/48 382/190 |
| 8,494,258 B2 * | 7/2013 | Yokono | G06K 9/6256 382/159 |
| 8,774,524 B2 * | 7/2014 | Tsunematsu | G06T 7/12 382/199 |
| 9,904,874 B2 * | 2/2018 | Shoaib | G06K 9/6268 |
| 2009/0106177 A1 | 4/2009 | Kobayashi | |
| 2018/0225125 A1 | 8/2018 | Okamoto et al. | |
| 2020/0125889 A1 * | 4/2020 | Okamoto | G06N 3/126 |
| 2021/0034905 A1 * | 2/2021 | Lee | G06K 9/6274 |

FOREIGN PATENT DOCUMENTS

| | | |
|---|---|---|
| JP | 2007-200246 A | 8/2007 |
| JP | 2009-104275 A | 5/2009 |
| JP | 2013-125524 A | 6/2013 |
| WO | 2017/068675 A1 | 4/2017 |

OTHER PUBLICATIONS

Yoshimura, Yuichiro et al., "Automatic Construction of Image Inspection Algorithm by using Image Processing Network Programming", Proceedings of SPIE, vol. 10338, pp. 103381B-1-103381B-8, Mar. 13, 2017, XP060087508.

Yapi, Daniel et al., "A Learning-Based Approach for Automatic Defect Detection in Textile Images", IFAC-Papersonline, vol. 48, No. 3, pp. 2423-2428, Jan. 1, 2015, XP055713398.

Extended European Search Report dated Jul. 28, 2020 for corresponding European Patent Application No. 17920292.4, 8 pages.

* cited by examiner

<EARLY LEARNING STAGE>

NG IMAGE 1

<EARLY LEARNING STAGE>

NG IMAGE 2

OK IMAGE FOR LEARNING

TARGET IMAGE

TARGET IMAGE
(NG REGION)

FIG. 14A
|  | OK | NG | TOTAL |
|---|---|---|---|
| FOR LEARNING | 20 | 20 | 40 |
| FOR EVALUATION | 80 | 80 | 160 |
FIG. 14B
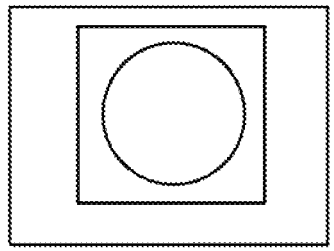
FIG. 14C
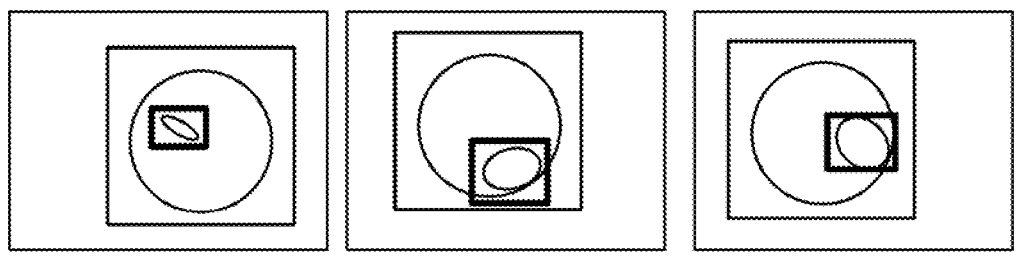

FIG. 14D

WITHOUT NG REGION TEACHING

| GENERATION NUMBER | OK DETERMINATION | OVER-DETECTION | MISS | NG DETECTION | ACCURACY RATE |
|---|---|---|---|---|---|
| 18 | 80 | 0 | 13 | 67 | 0.918 |
| 54 | 80 | 0 | 2 | 78 | 0.987 |
| 127 | 80 | 0 | 1 | 79 | 0.993 |
| 282 | 80 | 0 | 2 | 78 | 0.987 |
| 400 | 80 | 0 | 1 | 79 | 0.993 |

FIG. 14E

WITH NG REGION TEACHING

| GENERATION NUMBER | OK DETERMINATION | OVER-DETECTION | MISS | NG DETECTION | ACCURACY RATE |
|---|---|---|---|---|---|
| 12 | 80 | 0 | 8 | 72 | 0.950 |
| 54 | 80 | 0 | 3 | 77 | 0.981 |
| 141 | 80 | 0 | 1 | 79 | 0.993 |
| 159 | 80 | 0 | 0 | 80 | 1.000 |
| 268 | 80 | 0 | 0 | 80 | 1.000 |

WITHOUT NG REGION TEACHING
(400TH GENERATION)

INSPECTION IMAGE (EVALUATION IMAGE)

OK IMAGE          NG IMAGE

FEATURE EXTRACTION IMAGE     OUTER DIAMETER PORTION IS EXTRACTED AS FEATURE PORTION

RESULTS OF QUALITY DETERMINATION AND
NG REGION ESTIMATION

OK DETERMINATION      OK DETERMINATION

WITH NG REGION TEACHING (268TH GENERATION)

INSPECTION IMAGE (EVALUATION IMAGE)

OK IMAGE　　　　　　　　NG IMAGE

FEATURE EXTRACTION IMAGE　　　ONLY SCRATCH OR FOREIGN OBJECT IS EXTRACTED AS FEATURE VALUE

RESULTS OF QUALITY DETERMINATION AND NG REGION ESTIMATION

OK DETERMINATION　　　　　　NG DETERMINATION

OK IMAGE

NG IMAGE: IMAGE BEFORE PREPROCESSING
(ORIGINAL IMAGE)

NG IMAGE: IMAGE AFTER PREPROCESSING
(INPUT IMAGE)

FIG. 18D

WITHOUT NG REGION TEACHING

| GENERATION NUMBER | OK DETERMINATION | OVER-DETECTION | MISS | NG DETECTION | ACCURACY RATE |
|---|---|---|---|---|---|
| 35 | 67 | 13 | 17 | 63 | 0.812 |
| 146 | 67 | 13 | 17 | 63 | 0.812 |
| 262 | 67 | 13 | 8 | 72 | 0.868 |
| 500 | 66 | 14 | 13 | 67 | 0.831 |
| 平均 | 66.7 | 13.2 | 13.7 | 66.2 | 0.831 |

FIG. 18E

WITH NG REGION TEACHING

| GENERATION NUMBER | OK DETERMINATION | OVER-DETECTION | MISS | NG DETECTION | ACCURACY RATE |
|---|---|---|---|---|---|
| 55 | 71 | 9 | 10 | 70 | 0.881 |
| 163 | 70 | 10 | 12 | 68 | 0.862 |
| 212 | 60 | 20 | 8 | 72 | 0.825 |
| 500 | 71 | 9 | 8 | 72 | 0.893 |
| 平均 | 68.0 | 12.0 | 9.5 | 70.5 | 0.865 |

OK IMAGE→OK DETERMINATION

NG IMAGE→
NG DETERMINATION

NG IMAGE→
NG DETERMINATION

NG IMAGE→
NG DETERMINATION

INFORMATION PROCESSING DEVICE, RECORDING MEDIUM RECORDING INFORMATION PROCESSING PROGRAM, AND INFORMATION PROCESSING METHOD

CROSS-REFERENCE TO RELATED APPLICATION

This application is a continuation application of International Application PCT/JP2017/027633 filed on Jul. 31, 2017 and designated the U.S., the entire contents of which are incorporated herein by reference.

FIELD

The present embodiment relates to an information processing device, an information processing program, and an information processing method.

BACKGROUND

An image processing program for executing desired image processing by genetic programming is generated automatically.

Related art is disclosed in International Publication Pamphlet No. WO 2017/068675.

SUMMARY

According to an aspect of the embodiments, an information processing device includes: a memory; and a processor coupled to the memory and configured to: accept specification of a feature region that includes a characteristic portion in a learning image; create first data that indicates a degree of overlap between the feature region and each of divided regions obtained by dividing the learning image; perform image conversion on the learning image by an image classification program in which element filters are combined; calculate an image feature value of each of the divided regions from an image obtained; create second data that indicates the image feature value corresponding to each of the divided regions; calculate a similarity between the first data and the second data; and use a result of evaluating the image classification program on the basis of the similarity, for execution of a genetic programming.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 14A to 14E are diagrams (part 1) for explaining results of performing learning and quality determination on pseudo NG images.

FIGS. 18A to 18E are diagrams illustrating results of testing learning and quality determination according to the second embodiment.

DESCRIPTION OF EMBODIMENTS

For example, an input image and a target processing result (target image or the like) are used to optimize the image processing program by genetic programming.

For example, as a type of automatic generation of the image processing program, a method of automatically generating an image classification program that performs class classification of images (category classification) may be provided. By using the image classification program, for example, objects imaged in the images can be classified into two classes, a non-defective product and a defective product.

For example, in automatic generation of a quality determination algorithm, learning has been performed by using a plurality of learning images and teaching data indicating only whether objects imaged in the respective learning images are non-defective products or defective products. However, in such a method, in addition to a portion that is originally a cause determined to be a defective product, a difference irrelevant to quality may be used for learning as a quality determination criterion, and there has been a possibility that determination accuracy is reduced.

In one aspect, an information processing device, an information processing program, and an information processing method enabled to automatically generate an image classification program capable of classifying images with high accuracy may be provided.

First Embodiment

Hereinafter, a first embodiment will be described in detail of an image classification device as an information processing device, with reference to FIGS. 1 to 16. The image classification device according to the first embodiment has a function of automatically generating an image classification program in which element filters are combined, on the basis of genetic programming, and a function of executing the image classification program generated to perform image classification processing.

Figure 1:
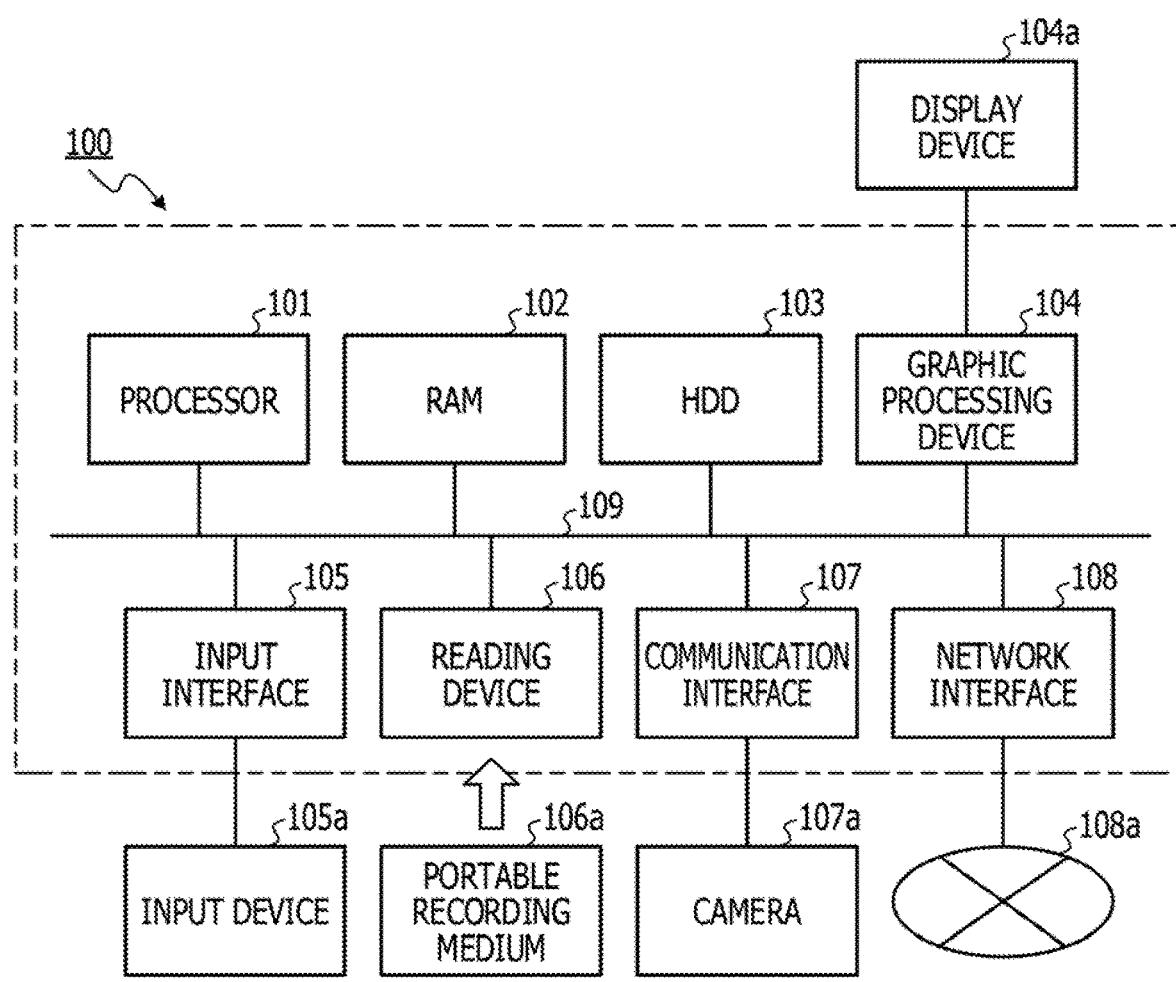
FIG. 1 is a diagram illustrating an example of a hardware configuration of an image classification device according to a first embodiment.

FIG. 1 is a diagram illustrating an example of a hardware configuration of an image classification device 100 according to the first embodiment. The image classification device 100 includes a processor 101, a RAM 102, an HDD 103, a graphic processing device 104, an input interface 105, a reading device 106, a communication interface 107, and a network interface 108. Each unit of the image classification device 100 is connected to a bus 109.

The processor 101 controls the entire image classification device 100. The processor 101 may also be a multiprocessor. The processor 101 is, for example, a central processing unit (CPU), a micro processing unit (MPU), a digital signal processor (DSP), an application specific integrated circuit (ASIC), a programmable logic device (PLD), or the like. Furthermore, the processor 101 may be a combination of two or more elements of the CPU, the MPU, the DSP, the ASIC, and the PLD.

The RAM 102 is used as a main storage device of the image classification device 100. The RAM 102 temporarily stores at least a part of an operating system (OS) program or an application program to be executed by the processor 101. Furthermore, the RAM 102 stores various data required for processing by the processor 101.

The HDD 103 is used as an auxiliary storage device of the image classification device 100. The HDD 103 stores the OS program, the application program, and various data. Note that, another kind of non-volatile storage device such as a solid state drive (SSD) can be used as the auxiliary storage device.

The graphic processing device 104 is connected to a display device 104a. The graphic processing device 104 causes the display device 104a to display an image in accordance with a command from the processor 101. Examples of the display device include a liquid crystal display, an organic electroluminescence (EL) display, and the like.

The input interface 105 is connected to an input device 105a. The input interface 105 transmits a signal output from the input device 105a to the processor 101. Examples of the input device 105a include a keyboard, a pointing device, and the like. Examples of the pointing device include a mouse, a touch panel, a tablet, a touch pad, a trackball, and the like.

A portable recording medium 106a is attached/detached to/from the reading device 106. The reading device 106 reads data recorded in the portable recording medium 106a and transmits the data to the processor 101. Examples of the portable recording medium 106a include an optical disk, a magneto-optical disk, a semiconductor memory, and the like.

The communication interface 107 transmits/receives data to/from a connected external device. In the first embodiment, a camera 107a is connected as the external device to the communication interface 107, and the communication interface 107 transmits image data transmitted from the camera 107a to the processor 101.

The network interface 108 transmits/receives data to/from another device via the network 108a.

The image classification device 100 automatically generates an image classification program for classifying an input image into one of a plurality of classes, by genetic programming. The image classification processing based on the image classification program generated includes, for example, processing of determining whether a product or part imaged in the input image is a non-defective product or a defective product, processing of determining whether or not a face is imaged in the input image, and the like.

The processing implemented by the image classification program includes classifier generation processing of generating a classifier by learning using a learning image, and preprocessing of generating feature information input to the classifier on the basis of the learning image. To implement high-accuracy image classification, both points are important of what feature value is extracted from the learning image and used, and what classifier is generated on the basis of the obtained feature value. The image classification device 100 searches for an optimal combination of a classifier generation algorithm and a preprocessing algorithm, by genetic programming. Therefore, an image classification program is generated that implements classifier processing capable of the high-accuracy image classification.

(About Individual Handled in Genetic Programming)

Figure 2:
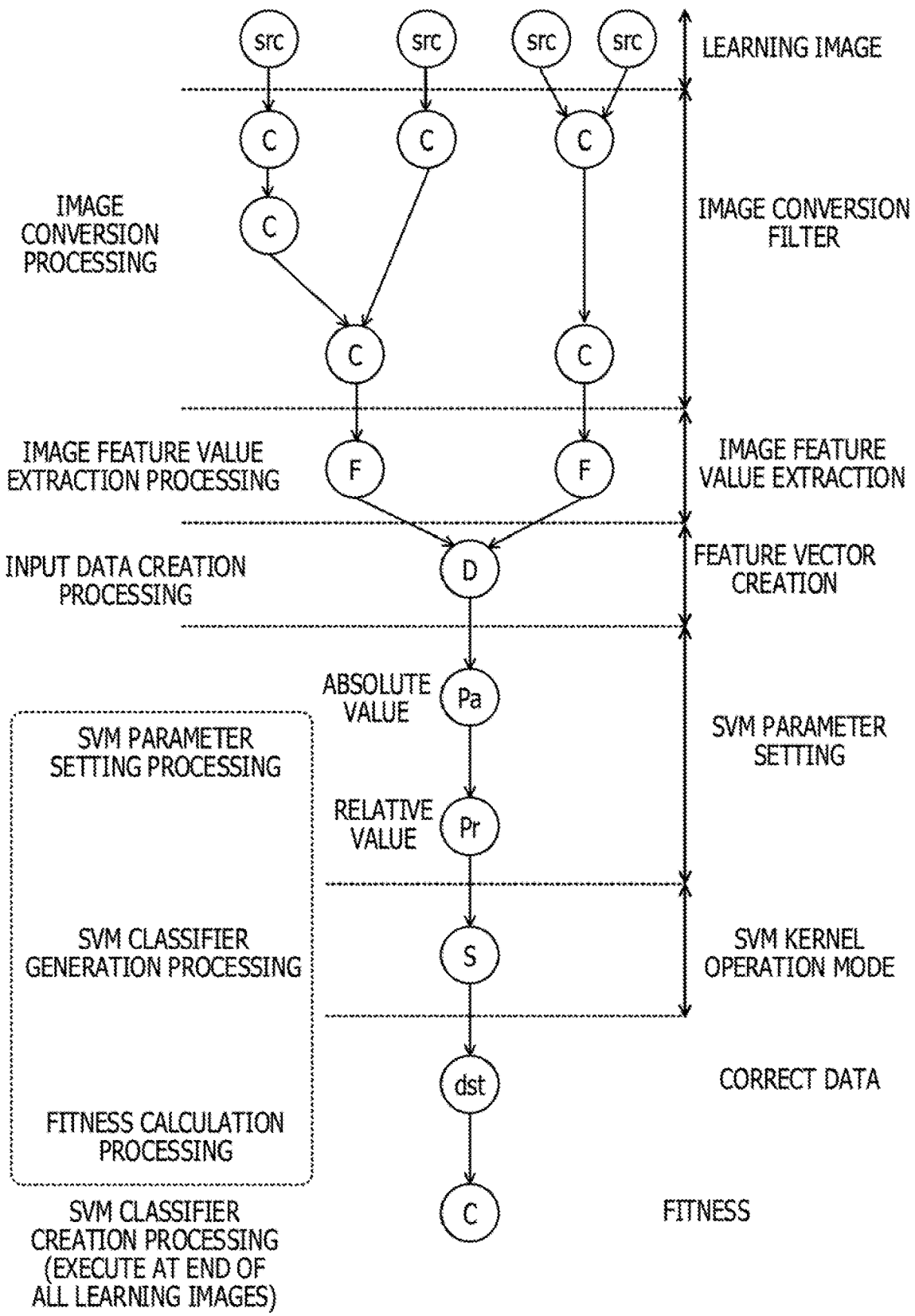
FIG. 2 is a diagram illustrating an example of a basic configuration of a tree structure filter sequence of an individual handled in genetic programming.

FIG. 2 is a diagram illustrating an example of a basic configuration of a tree structure filter sequence of an individual handled in genetic programming. As illustrated in FIG. 2, the individual is represented by a tree structure in which a program module is set as an element of each node, and in the tree structure, various types of image conversion are applied to an input image to generate a feature extraction image, an image feature values are extracted from the generated image, the image feature values are combined to create a feature vector, and learning or determination is executed for determining an OK image and an NG image by an SVM classifier. Note that, it is meant that the OK image is an image in which a non-defective product is imaged, and the NG image is an image in which a defective product is imaged. Furthermore, the tree structure representing the individual is divided into sections (processing) each including one or more adjacent levels. In the first embodiment, the tree structure is divided into image conversion processing, image feature value extraction processing, input data creation processing, SVM classifier creation processing, from the leaf side (upper side in FIG. 2) toward the root side (lower side in FIG. 2). Note that, the SVM classifier creation processing includes SVM parameter setting processing, SVM classifier generation processing, and fitness calculation processing.

Here, the image conversion processing, the image feature value extraction processing, and the input data creation processing are associated with preprocessing for generating data to be input to the classifier. In the image conversion processing, an image conversion filter is used to convert an input image to be suitable for feature extraction. Note that, as the image conversion filter, it is possible to apply a Smooth filter, a Sobel filter, a Laplace filter, an And filter, a Sub filter, an Add filter, an Or filter, an Erode filter, a Dilate filter, a Threshold filter, and the like.

The image feature value extraction processing is processing of extracting a feature value from the image converted by the image conversion processing by using a feature extraction filter. As the feature extraction filter, it is possible to apply a filter that calculates an average luminance, a filter that calculates a luminance histogram, a filter that executes fast Fourier transformation (FFT), and the like. Furthermore, it is also possible to apply the same type of filter having different control parameters such as the number of divided regions.

The input data creation processing is processing of generating input data (feature vector) to be input to the classifier on the basis of the feature value extracted by the image feature value extraction processing. As an input data generation module for generating the input data to be input to the classifier, it is possible to use, for example, a program module having one or two inputs, and a program module that executes normalization of the input data, compression of the input data, and the like.

The SVM parameter setting processing includes, for example, processing of setting the absolute value of a learning parameter, and processing of setting the relative value of the learning parameter. The set absolute value is increased or decreased by addition and subtraction, scaling, or the like using the set relative value, whereby the learning parameter for generating the classifier is determined.

The SVM classifier generation processing determines a kernel function and an operation mode to be used. As the kernel function, it is possible to apply, for example, a LINEAR kernel, a POLYNOMIAL kernel, a Radial Basis Function (RBF) kernel, a SIGMOID kernel, and the like. Furthermore, as the operation mode, learning of the tree structure and the SVM classifier, and quality determination of the input image are determined.

The fitness calculation processing executes classification processing of determining quality of the learning image (OK image or NG image) on the basis of the input data created by the input data creation processing in accordance with classifier information generated by the SVM classifier generation processing, and compares a classification result by the classification processing with quality indicated by a label added to the learning image to determine whether the classification result is correct or incorrect. Then, the fitness calculation processing executes determination a plurality of times by using cross-validation or the like to calculate an accuracy rate for the learning image, and calculates a fitness of the individual on the basis of the calculated accuracy rate. Here, the fitness is an index indicating how much an output result of an automatically generated tree structure filter sequence matches a target image recognition result. In the first embodiment, a penalty term is also considered in calculation of the fitness of each individual in the fitness calculation processing. As the penalty term, it is possible to apply the number of feature dimensions of the classifier, the size of the tree structure (the number of nodes or the maximum number of levels of nodes included in the tree structure), the number of support vectors in a case where the SVM classifier is used, and the like. For example, in general, as the classifier becomes more complex than the obtained data, over-fitting is more likely to occur. Thus, for example, as the number of feature dimensions is larger, or the size of the tree structure is larger, or the number of support vectors is larger, the fitness is calculated by performing correction to reduce the accuracy rate. Note that, the number of feature dimensions can be determined on the basis of the input data generation module set in the input data creation processing. The accuracy rate is corrected depending on the penalty term in this way, whereby superiority or inferiority of a learning result can be accurately evaluated, and an image classification program having high classification accuracy can be generated. Note that, although details will be described later, in the fitness calculation processing, consideration is also made for a penalty term based on a similarity between a position of an NG region specified on an image by a user and a distribution of feature values obtained from an image converted by the image conversion processing. In this case, if the similarity is large, a value of the penalty term is decreased, and if the similarity is small, the value of the penalty term is increased.

As described above, the individual is generated by setting each node of the tree structure of FIG. 2. The image classification device 100 first generates a plurality of initial individuals to be included in an individual group, then generates a child individual on the basis of a parent individual selected from the individual group, and replaces the parent in the individual group with a child individual having a high fitness. The image classification device 100 repeatedly executes such processing, and outputs an individual having a fitness greater than or equal to a certain degree (greater than or equal to a predetermined threshold value) as the best individual.

In such processing, when a parent individual is evolved to generate a child individual, elements of one or more nodes of the parent individual are changed by crossover of the parent individual, or mutation of the parent individual or the child individual. In a case where an element of a node is changed for evolution of the parent individual, the changed element becomes a program module prepared in advance for a section to which the node belongs. For example, in a case where an element of the image conversion processing is changed by mutation, the changed element is selected from image conversion filters corresponding to the image conversion processing.

By such processing, the combination is optimized of processing algorithms of respective sections. For example, a combination is optimized of a processing algorithm for extracting a feature value input to the classifier and a processing algorithm for generating the classifier. As a result, an appropriate classifier type and learning parameter for image classification are selected, and a feature value can be extracted suitable for input to the classifier. The image classification program having high classification accuracy can therefore be generated.

(Outline of Processing)

Next, an outline will be described of processing in the first embodiment. In the first embodiment, in the learning using the learning image, the user inputs an NG region that is a basis for determining NG among learning images (NG images), to teach the image classification device 100. Note that, it is assumed that the user is familiar with the quality determination criterion, identifies the NG region by visual inspection, and inputs the coordinates of the NG region via the input device 105a. Then, the image classification device 100 calculates a similarity between a position of the NG region in the learning image and a distribution of feature values of an image after the learning image is converted. Moreover, the image classification device 100 calculates a fitness of an individual in consideration of the calculated similarity and uses the fitness for learning of an image classification program by genetic programming.

Hereinafter, detailed description will be made for each of the types of processing described above.

(1) NG Region Teaching Method

Hereinafter, a method will be described in which the user specifies an NG region and teaches the NG region to the image classification device 100. Note that, the NG region is a region including a characteristic portion (a scratch or a foreign object) in the learning image.

Figure 3A:
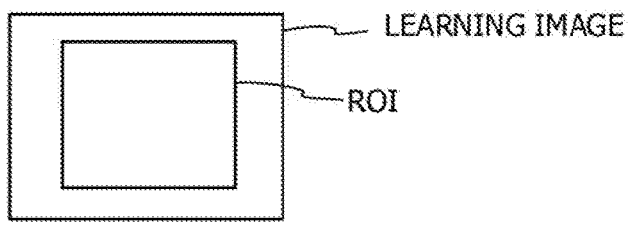
FIGS. 3A to 3C are diagrams for explaining an NG region teaching method.

FIG. 3A illustrates an example of the learning image. In the learning image of FIG. 3A, a rectangular object exists, and a region where the object exists is referred to as a region of interest (ROI). Note that, in the first embodiment, in principle, the ROI is set at an arbitrary position in the image, and learning, inspection, or the like is performed only within the ROI, but the ROI may be the entire image.

Figure 3B:
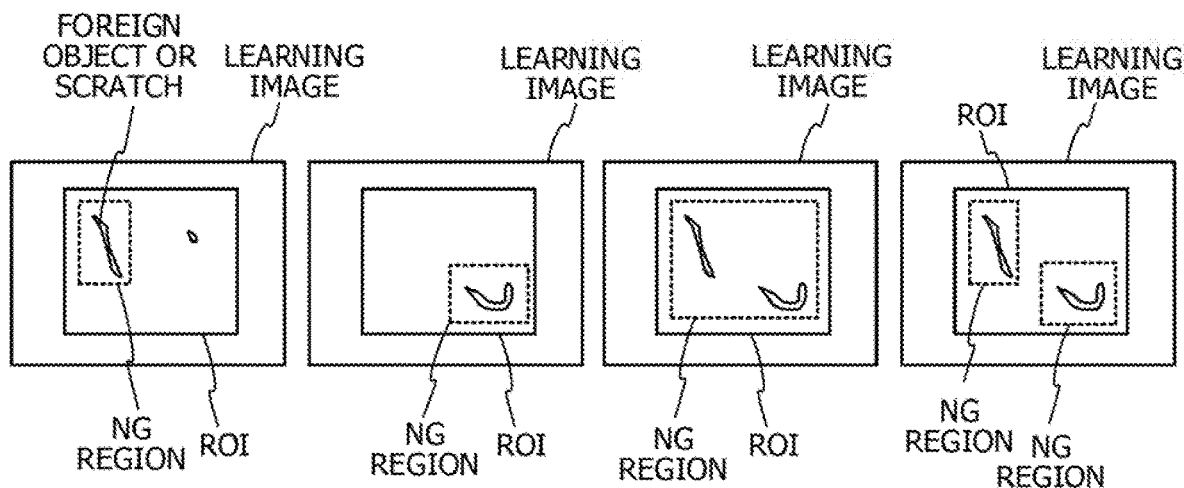

Here, it is assumed that no foreign object or scratch exists on the object in the OK image of the learning image (see FIG. 3A), and a foreign object or scratch exists in the NG image (see FIG. 3B). In this case, when the user teaches the NG region, a rectangular region as indicated by a broken line frame in FIG. 3B is specified as the NG region. The NG region is made to be a rectangular region as described above, whereby teaching work can be simplified, and calculation can be simplified of indexing of the NG region as described later.

In this case, as illustrated in the rightmost diagram of FIG. 3B, in a case where foreign objects and scratches are distributed in a complicated manner, a plurality of rectangular regions (NG regions) may be taught, or as illustrated in the second diagram from the right of FIG. 3B, one large rectangular region (NG region) may be taught. Furthermore, as illustrated in the leftmost diagram of FIG. 3B, a rectangular region (NG region) may be taught without including some foreign objects and scratches. Note that, in the first embodiment, it is based on the premise that, in an inspection image (unknown image) given after the learning, the NG region does not always exist at the same position as that in the learning image, and the same NG (foreign object or scratch) does not always exist.

Figure 3C:
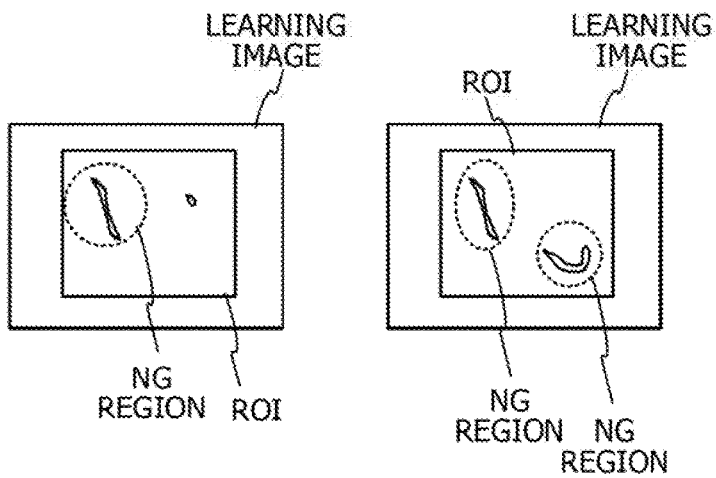

Note that, the user may teach the NG region not only by the rectangular region but by a basic figure other than a rectangle such as a circular or an elliptical shape as illustrated in FIG. 3C.

(2) Indexing of NG Region

Next, processing will be described in which the image classification device 100 indexes the NG region taught as described above, with reference to FIGS. 4A to 4D.

Figure 4A:
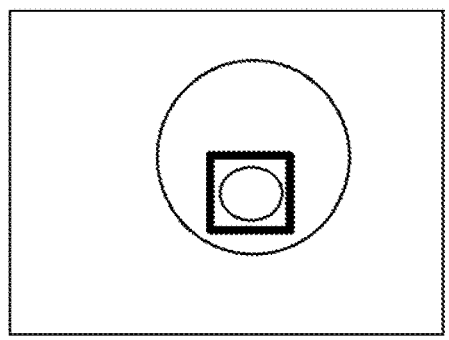
FIGS. 4A to 4D are diagrams for explaining indexing of an NG region.

FIG. 4A illustrates an NG image in which a circular part (object) exists near the center of an image. The NG image of FIG. 4A is a test image (learning image) in which an ellipse that is a dent or a foreign object is drawn on the surface of the object. It is assumed that the user teaches, as an NG region, a region indicated by a white thick line rectangular frame in FIG. 4A for the learning image.

Figure 4B:
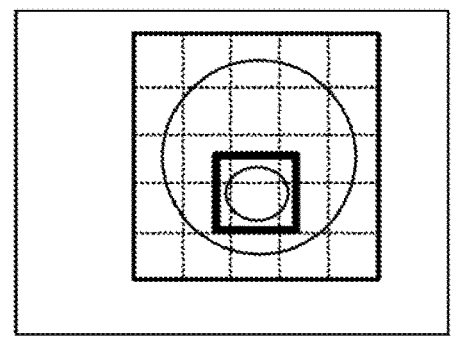

Furthermore, it is assumed that the ROI of the image is set as a white thin line rectangular frame in FIG. 4B. Note that, in the following, the term "in the image" may be simply used in the meaning of being in a range of the ROI.

Divided regions are set for the ROI in the image. For example, when divided into M regions horizontally and divided into N regions vertically, the ROI is divided into M×N regions. FIG. 4B illustrates an example in which the ROI is divided into 5×5 regions. Note that, the number of divided regions can be set by the user. However, this is not a limitation, and the number of divided regions may be determined in advance. It is assumed that each of the divided regions is numbered (see FIG. 4C).

Figure 4C:
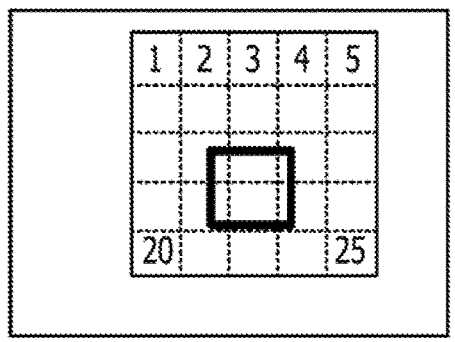
Figure 4D:
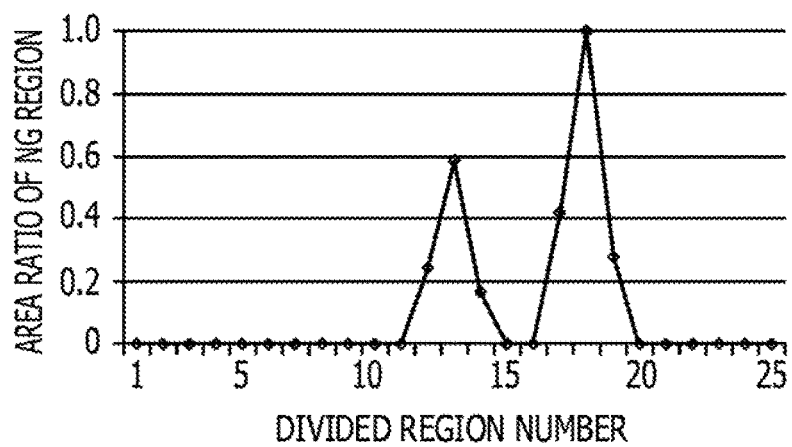

Indexing of the taught NG region is performed for such divided regions. In FIG. 4C, a black thick line rectangular frame (corresponding to the white thick line rectangular frame of FIG. 4A) is the NG region. Here, a value indicating how much the NG region occupies each of the divided regions is obtained as an index value. FIG. 4D is a graph illustrating the obtained index value. The graph of FIG. 4D illustrates where the taught NG region is distributed in the image, and the index value takes a value of 0.0 to 1.0 in each of the divided regions. Note that, the index value is not limited to this, and may be a value indicating how much the NG region is divided into each of the divided regions. In this case, the sum of the index values in all the divided regions is 1.0. Note that, in a case where a plurality of rectangular regions (NG regions) exists, indexing can be similarly performed. In the following, data indicating a distribution of the NG region in the image as illustrated in FIG. 4D is referred to as "NG teaching region data", "NG teaching region index", or the like. Note that, the NG teaching region data (NG teaching region index) can be said to be first data indicating a degree of overlap between the NG region and each of the divided regions obtained by dividing the learning image.

(3) Indexing of Image Feature Value in Divided Region

Next, indexing processing will be described of an image feature value of a divided region by the image classification device 100, with reference to FIG. 4E.

Figure 4E:
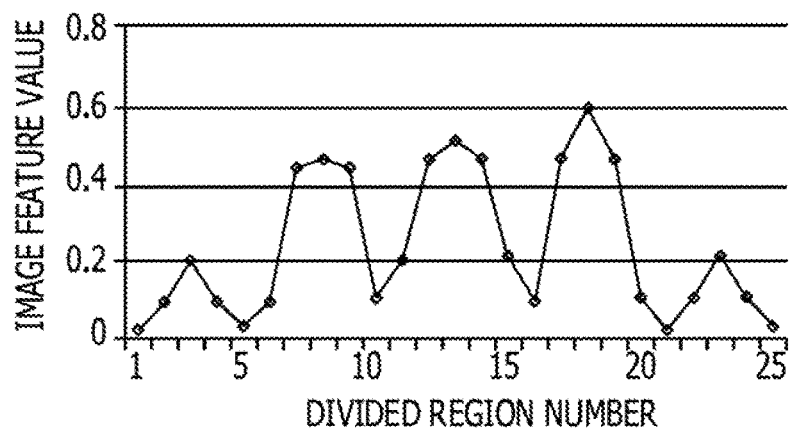
FIG. 4E is a diagram for explaining indexing of an image feature value of a divided region.

FIG. 4E is a graph illustrating how feature values of a feature extraction image (converted image) obtained by image conversion processing described later are distributed in each of the divided regions.

FIG. 4E illustrates an example in which it is assumed that the feature extraction image is an original image as it is, and an average luminance in each of the divided regions is calculated as the image feature value. In the first embodiment, as illustrated in FIG. 2, image feature values are extracted from the feature extraction image by various feature extraction filters to create a quality determination classifier, and the feature extraction image is an important image in quality determination. Note that, in addition to the average luminance in each of the divided regions, a standard deviation, a range (difference between the maximum value and the minimum value), or the like of variation can also be used as the feature value of each of the divided regions.

In the following, data representing how the image feature value in the converted image is distributed in each of the divided regions as illustrated in FIG. 4E is referred to as "image feature distribution data", "image feature distribution index", or the like. Note that, the image feature distribution data (image feature distribution index) can be said to be second data indicating the image feature value for each of the divided regions calculated from the converted image.

(4) Similarity Between NG Region Index and Image Feature Distribution Index

The two indices obtained in (2) and (3) above (FIGS. 4D and 4E) respectively represent how the NG region is distributed and how the image feature values are distributed. If these indices are similar to each other, it can be said that the image obtained by image conversion correctly extracts the feature of an NG portion. Thus, in the first embodiment, image conversion processing is learned that increases the similarity. Here, the similarity between the two indices can be obtained as a cosine similarity or a normalized correlation value by regarding the two indices as vectors.

Figure 5A:
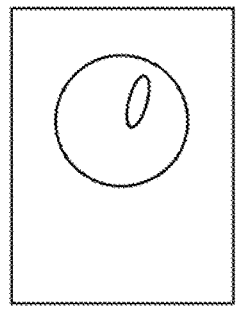
FIGS. 5A and 5B are diagrams (part 1) for explaining specific examples of similarity calculation.
Figure 5A:
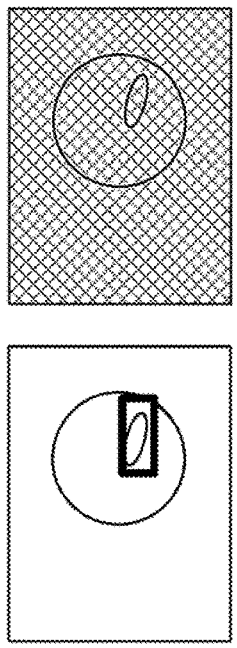
Figure 5A:
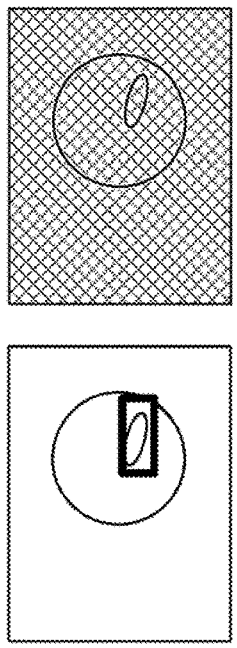
Figure 5B:
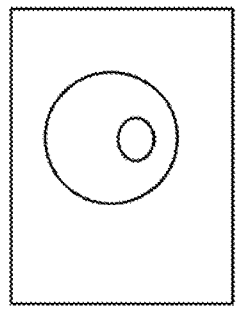
Figure 5B:
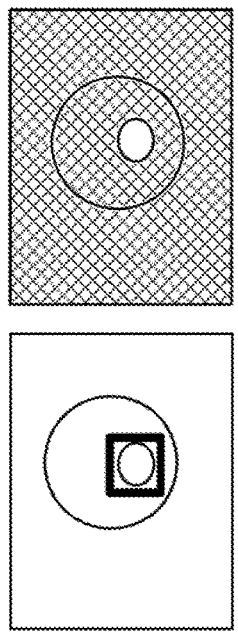
Figure 5B:
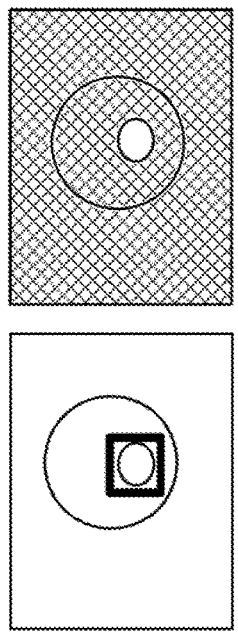
Figure 5B:
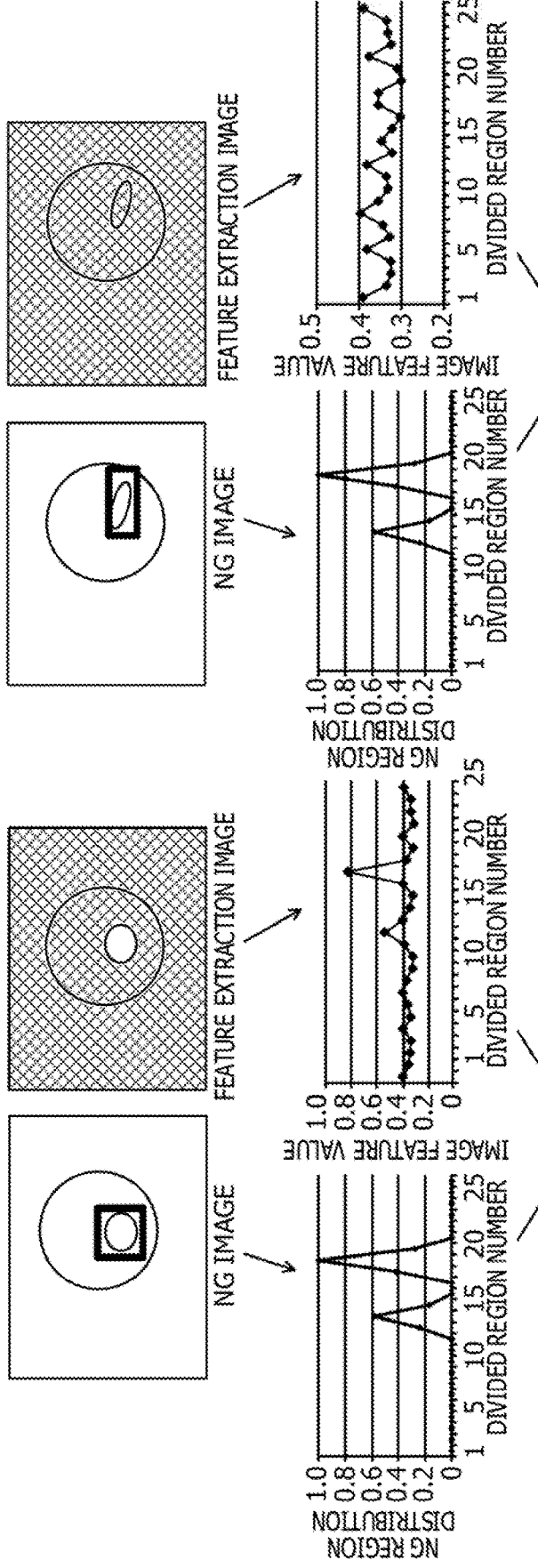

Hereinafter, specific examples will be described of similarity calculation, with reference to FIGS. 5 and 6. The upper part of each of FIGS. 5A and 5B illustrates an input image (learning image) of an NG image. Furthermore, the middle part of each of FIGS. 5A and 5B illustrates an input image in which an NG region is indicated by a white rectangular frame, and a feature extraction image after image conversion is performed on each input image in the early learning stage.

Moreover, the lower part of each of FIGS. 5A and 5B illustrates an NG teaching region index, and an image feature distribution index.

Figure 6A:
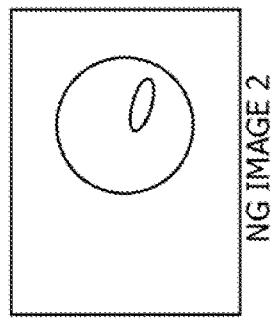
FIGS. 6A and 6B are diagrams (part 2) for explaining specific examples of similarity calculation.
Figure 6A:
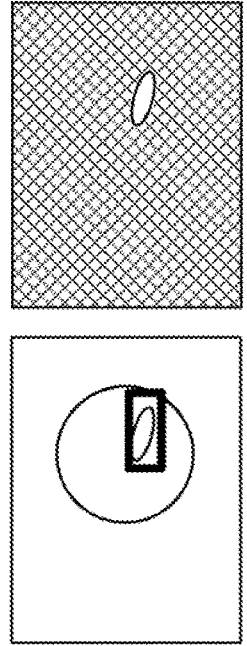
Figure 6A:
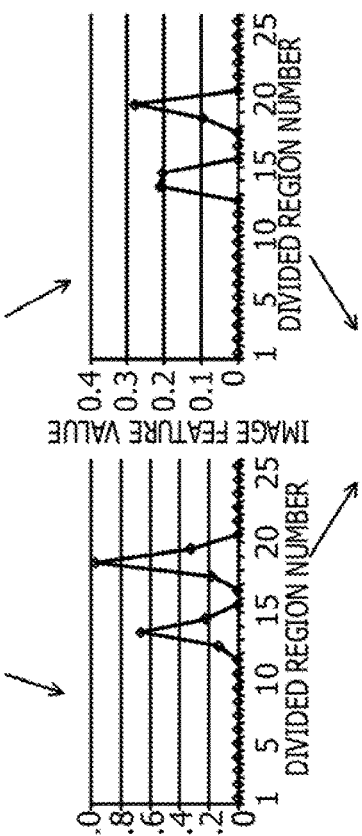
Figure 6B:
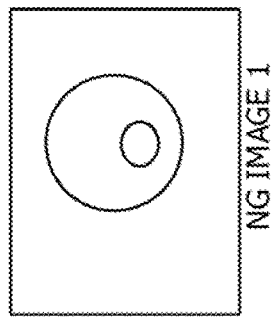
Figure 6B:
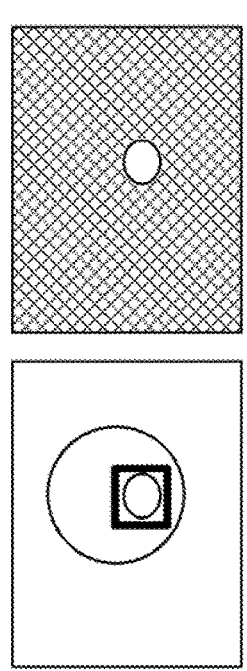
Figure 6B:
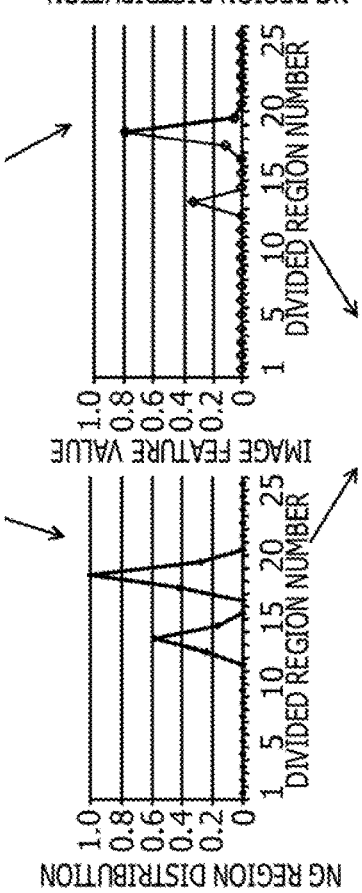

Furthermore, FIGS. 6A and 6B respectively illustrate diagrams corresponding to FIGS. 5A and 5B in the final learning stage. Here, in the examples of FIGS. 5 and 6, the NG teaching region index is a ratio of the NG region in each of the divided regions, and the image feature value is the average luminance in each of the divided regions of the converted image.

The lowest part of each of FIGS. 5 and 6 illustrates a result of the similarity between the NG teaching region index and the image feature distribution index, obtained by normalized correlation calculation. As illustrated in FIGS. 5A and 5B, in the early learning stage, the similarity of an NG image 2 is still very small. On the other hand, at the final learning stage, as illustrated in FIGS. 6A and 6B, the similarity is close to 1.0 in both an NG image 1 and the NG image 2, and it can be seen that only the NG portion can be extracted in the feature extraction image more accurately in the final learning stage.

Note that, in the first embodiment, as illustrated in FIG. 2, since there is a case where multiple branches exist in the tree structure filter sequence, the similarities of the NG region are also calculated by the number of branches. Thus, it is necessary to calculate a similarity (overall similarity) obtained by combining the multiple similarities, and as an example of a method for calculating the similarity, the following methods (a) and (b) can be considered. Note that, the overall similarity is calculated for each NG image.

(a) Average value, maximum value, or minimum value of absolute values of similarities for multiple branches (b) Average value, maximum value, or minimum value of similarities for multiple branches (5) Definition of Fitness Next, a method will be described for calculating the fitness in consideration of the similarity (overall similarity) obtained as described above.

To perform the learning from a state of FIGS. 5A and 5B (early learning stage) to a state of FIGS. 6A and 6B (final learning stage), the value of the penalty term based on the similarity is made small in a case where the similarity is high, and the fitness is defined as in the following equation (1). Furthermore, as indicated in the following equation (2), the penalty term based on the similarity is defined to be asymptotic to zero as the similarity increases (approaches 1.0). Note that, in calculation of a penalty amount, it is necessary to obtain the penalty amount on the basis of the overall similarity for each NG image described above. At that time, the overall similarities of respective NG images may be simply averaged, or a weighted average of the overall similarities of respective NG images may be taken. As a criterion for weighting, a weighting factor depending on the area of the NG region, or the like can be considered.

Fitness $$=\text{Accuracy rate}-\text{Penalty term of classifier}-\text{Penalty term based on similarity} \quad (1)$$

The fitness indicates an evaluation value of an automatically generated program, and the higher the fitness, the better the program.

Penalty Term Based on Similarity $$=1.0-\text{Average value of similarities of entire } NG \text{ image} \quad (2)$$

As expressed by the equation (2), the higher the similarity, the smaller the penalty term. The fitness expressed by the equation (1) is accordingly corrected to be increased as the sum of the terms.

Here, as the accuracy rate, an accuracy rate of the cross-validation for the learning image can be used. Hereinafter, a penalty based on the similarity between the NG teaching region data and the image feature distribution data is simply referred to as a "penalty term based on the similarity".

Note that, to reflect the penalty term based on the similarity in the fitness in an appropriate form, the penalty term based on the similarity may be multiplied by a fixed or variable weighting factor. For example, it is assumed that the normalized correlation calculation is used to calculate the similarity, the average value of the absolute values of the similarities of the multiple branches is obtained as the overall similarity, and the similarity penalty term is 1.0−(average value of absolute values of the similarities of the multiple branches). In this case, it is preferable to set the weighting factor to about 0.1 to 0.3 to obtain an appropriate fitness.

Note that, the value of the similarity may be converted to a negative value or converted to an inverse so that the penalty value becomes smaller as the similarity is higher.

(6) Estimation of NG Portion

Next, a method will be described for estimating the NG portion by the image classification device 100. Note that, it is assumed that learning of the image classification program by genetic programming has already been completed at the time of estimation of the NG portion. Note that, the NG portion means a divided region where there is a high possibility that a scratch or a foreign object exists among the divided regions.

Also in the estimation of the NG portion, as illustrated in FIGS. 4B and 4C, the image feature value of each of the divided regions is used. However, in FIGS. 4B and 4C, the image feature value of the NG image is targeted, but in this processing, the image feature value is obtained from the OK image.

Figure 7A:
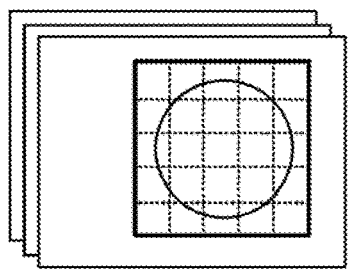
FIGS. 7A to 7F are diagrams for explaining estimation of an NG portion.
Figure 7B:
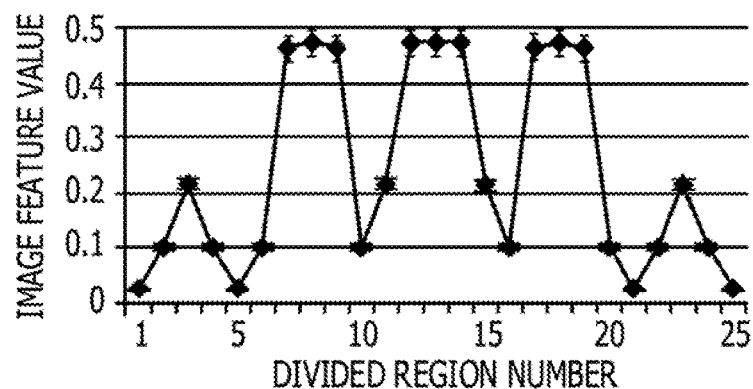

In other words, in this processing, as illustrated in FIG. 7A, region division is also performed for the ROI (white solid line rectangular frame) of the OK image for learning as before. Then, for each OK image for learning, a feature extraction image by image conversion is obtained, and then the distribution (average and standard deviation) of the image feature values is calculated in each of the divided regions. The distribution of the image feature values obtained in this way is expressed as illustrated in FIG. 7B. Note that, the data of FIG. 7B is stored as a normal distribution (normal range), at the time of learning.

Figure 7C:
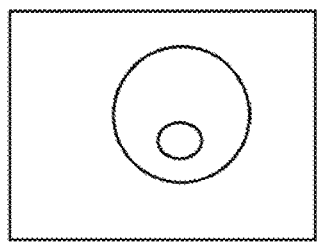
Figure 7D:
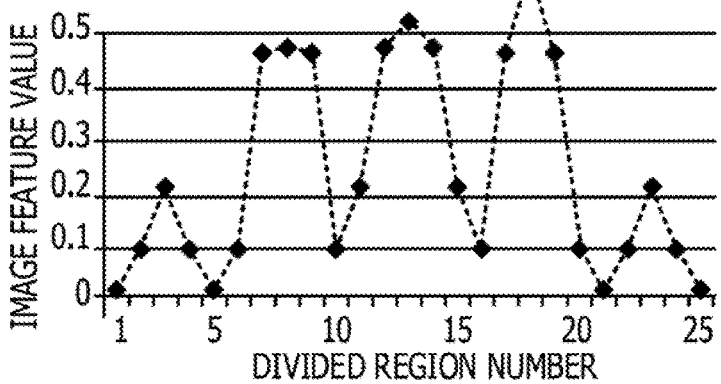

On the other hand, at the time of quality determination after the learning, the image feature value of each of the divided regions is similarly obtained as illustrated in FIG. 7D from an image to be inspected (target image) as illustrated in FIG. 7C, and an abnormality score with respect to the normal distribution is calculated on the basis of a difference from FIG. 7B. The abnormality score can be obtained by the following equation (3), for example.

Image Feature Abnormality Score $$=(\text{Image feature value of target image}-\text{Normal distribution average value})/\text{Normal distribution standard deviation} \quad (3)$$

Figure 7E:
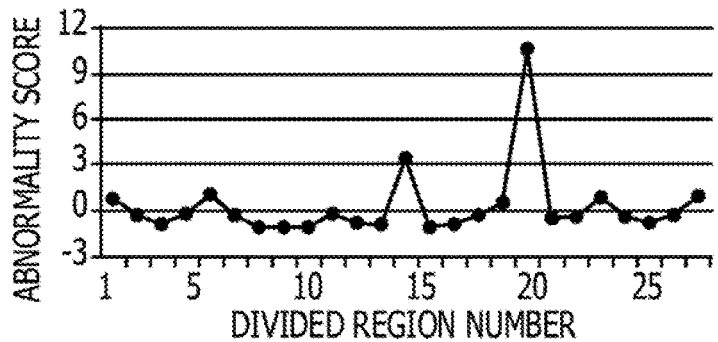

Since the abnormality score is obtained for each of the divided regions, the abnormality score can be expressed as illustrated in FIG. 7E. In the first embodiment, a divided region having an abnormality score greater than a predetermined threshold value is estimated as an NG portion.

Figure 7F:
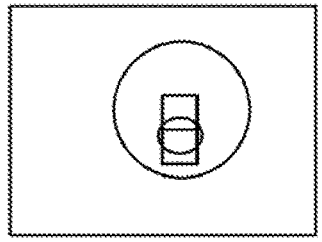

FIG. 7F illustrates an example in which a divided region having an abnormality score greater than or equal to the threshold value (=3) in FIG. 7E is estimated as an NG portion, and the divided region is overlaid on the target image. In FIG. 7F, the estimated NG portion is indicated by a white rectangular frame.

(About Processing Functions of Image Classification Device 100)

Figure 8:
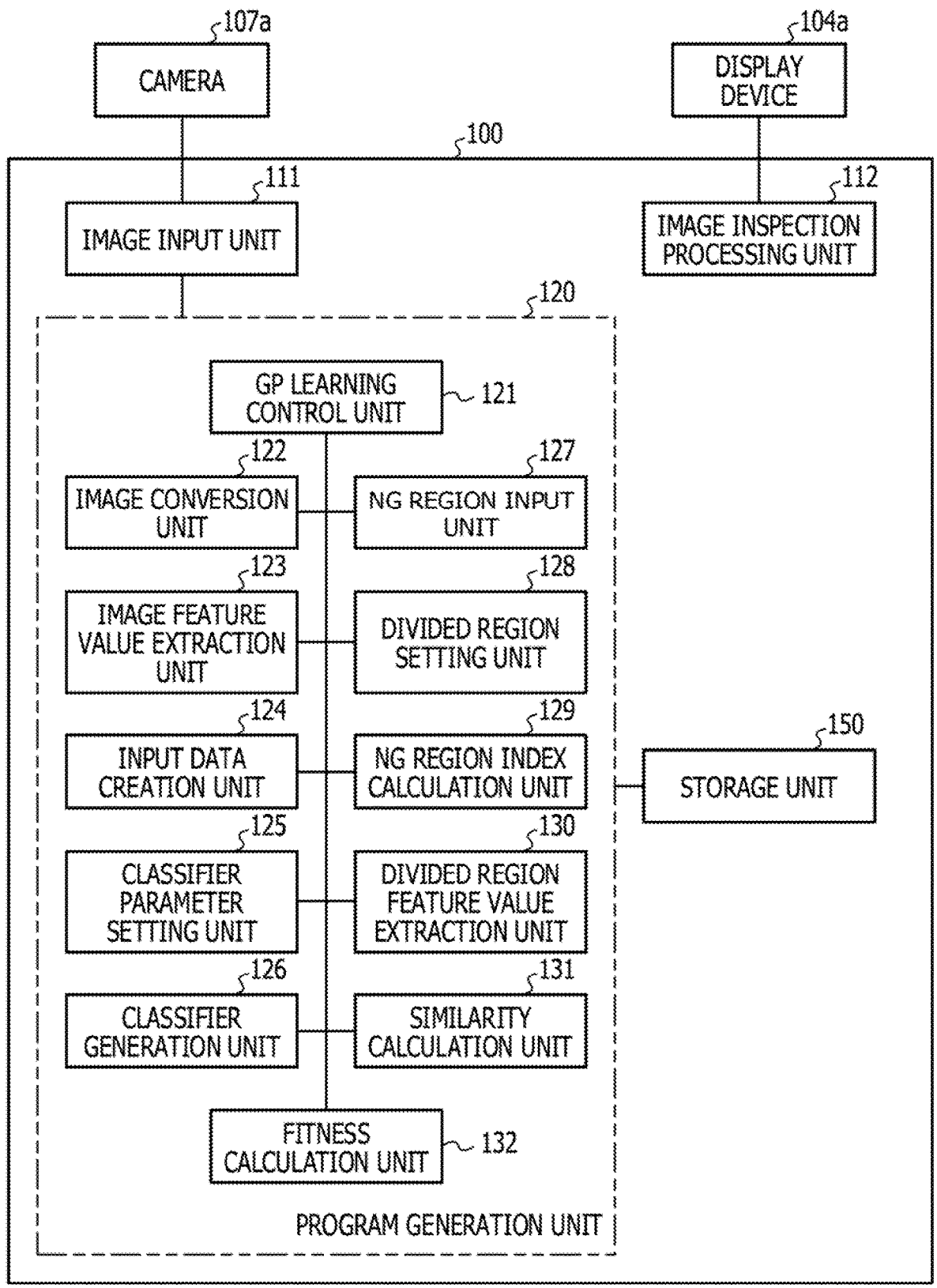
FIG. 8 is a block diagram illustrating a configuration example of processing functions of the image classification device.

FIG. 8 is a block diagram illustrating a configuration example of processing functions of the image classification device 100. The image classification device 100 includes an image input unit 111, an image inspection processing unit 112 as a determination unit, a program generation unit 120, and a storage unit 150.

Processing in the image input unit 111, the image inspection processing unit 112, and the program generation unit 120 is implemented, for example, by execution of a predetermined program (including an image classification program) by the processor 101 of the image classification device 100. The storage unit 150 is implemented as, for example, a storage area of the RAM 102 of the image classification device 100.

The image input unit 111 acquires data of an image captured by the camera 107a and outputs the data to the program generation unit 120 or the image inspection processing unit 112. The program generation unit 120 generates an image classification program by genetic programming, and stores, in the storage unit 150, data (data of the best individual) corresponding to the image classification program generated. Note that, the internal configuration of the program generation unit 120 will be described later.

The image inspection processing unit 112 acquires the data of the image captured by the camera 107a via the image input unit 111. Furthermore, the image inspection processing unit 112 reads the data of the image classification program (data of the best individual) stored in the storage unit 150, and determines quality of the acquired image by using the image classification program read. The image inspection processing unit 112 displays a determination result on, for example, the display device 104a.

The storage unit 150 stores a learning image and the data of the image classification program (data of the best individual) generated by the program generation unit 120. A label indicating quality of the learning image (OK image or NG image) is added to the learning image. As the learning image, an image can be used acquired by the image input unit 111 from the camera 107a.

Here, details of the program generation unit 120 will be further described. The program generation unit 120 includes a genetic programming (GP) learning control unit 121 as a processing unit, an image conversion unit 122, an image feature value extraction unit 123 as a third data creation unit, an input data creation unit 124, a classifier parameter setting unit 125, a classifier generation unit 126, an NG region input unit 127 as an accepting unit, a divided region setting unit 128, an NG region index calculation unit 129 as a first data creation unit, a divided region feature value extraction unit 130 as a second data creation unit, a similarity calculation unit 131 as a calculation unit, and a fitness calculation unit 132.

The GP learning control unit 121 controls execution of entire program generation processing by genetic programming. For example, the GP learning control unit 121 executes processing such as generation of an initial individual and evolution processing for the individual.

The image conversion unit 122 executes image conversion processing on the input image in accordance with the image conversion filter set in the node of the image conversion processing in the tree structure of the individual.

The image feature value extraction unit 123 executes feature value extraction processing from the input image after the image conversion in accordance with the feature extraction filter set in the node of the image feature value extraction processing in the tree structure of the individual.

The input data creation unit 124 generates input data to be input to the classifier on the basis of the feature value of the image in accordance with the program module set in the node of the input data creation processing in the tree structure of the individual.

The classifier parameter setting unit 125 executes processing of setting the learning parameter of the classifier in accordance with the absolute value and relative value set in the node of the SVM parameter setting processing in the tree structure of the individual.

The classifier generation unit 126 executes processing of generating the classifier by learning using the learning parameter set by the classifier parameter setting unit 125 in accordance with the kernel function and operation mode set in the node of the SVM classifier generation processing in the tree structure of the individual.

The NG region input unit 127 accepts specification of the NG region input by the user via the input device 105a, and inputs information (coordinates) on the NG region to the NG region index calculation unit 129.

The divided region setting unit 128 sets divided regions for the ROI as indicated by a white broken line in FIG. 4B.

The NG region index calculation unit 129 calculates an NG teaching region index as illustrated in FIG. 4D.

The divided region feature value extraction unit 130 extracts an image feature value of each of the divided regions, and calculates an image feature distribution index as illustrated in FIG. 4E.

The similarity calculation unit 131 calculates a similarity between the NG teaching region index (FIG. 4D) and the image feature distribution index (FIG. 4E) by normalized correlation calculation.

The fitness calculation unit 132 calculates a fitness on the basis of the similarity calculated by the similarity calculation unit 131.

Next, processing in the image classification device 100 will be described using a flowchart.

(Processing in Program Generation Unit 120)

Figure 9:
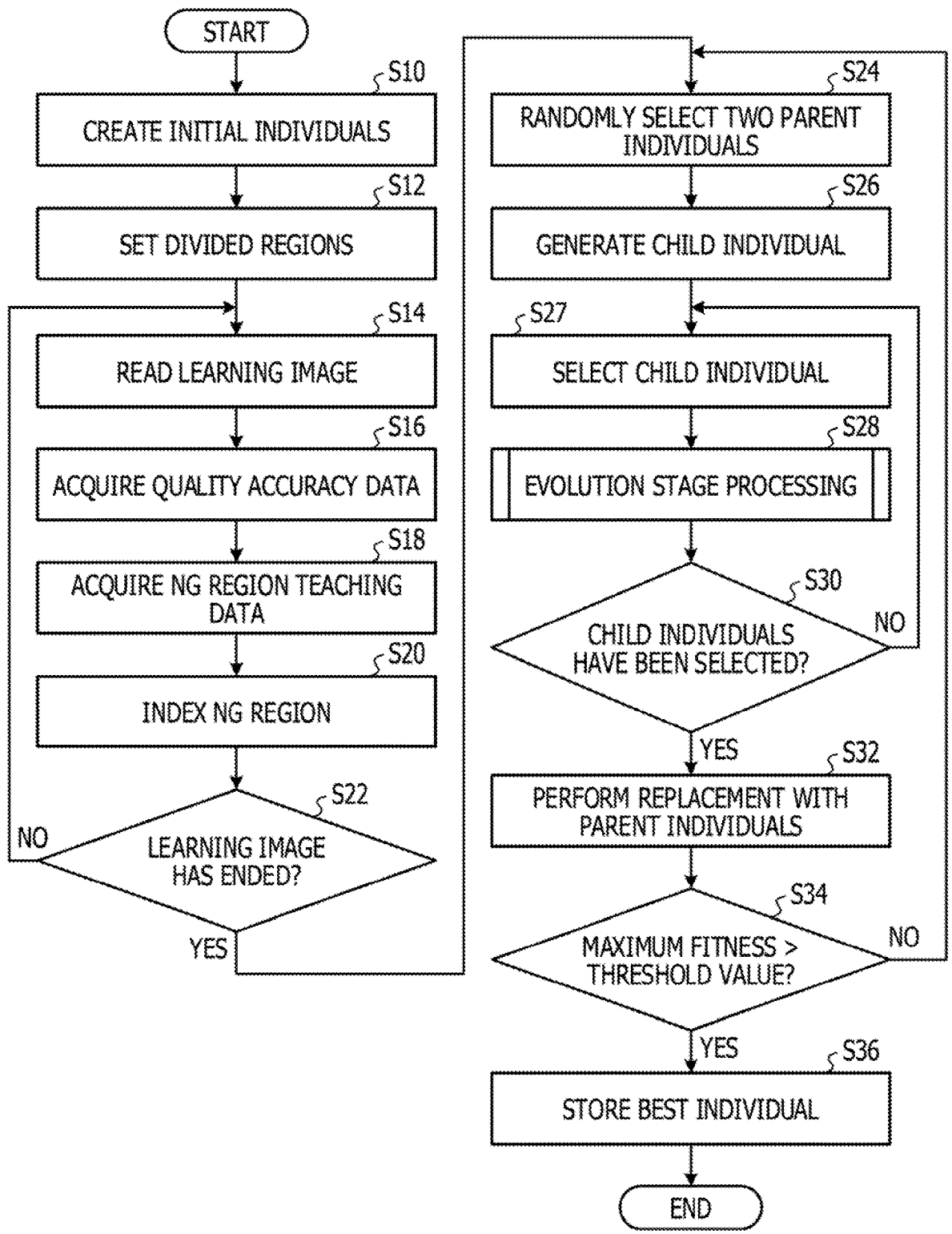
FIG. 9 is a flowchart illustrating an example of a processing procedure of a program generation unit.

FIG. 9 is a flowchart illustrating an example of a processing procedure of the program generation unit 120.

In the processing in FIG. 9, first, in step S10, the GP learning control unit 121 generates a plurality of initial individuals, and stores information indicating the generated initial individuals in the storage unit 150. Hereinafter, the individuals stored in the storage unit 150 are referred to as an "individual group".

As a procedure for generating an initial individual, basically, a node is set for each types of processing in the tree structure of the individual, and an element of each node is selected and set from program modules corresponding to the processing to which the node belongs.

Next, in step S12, the divided region setting unit 128 sets divided regions. Specifically, the divided region setting unit 128 sets how many regions the ROI is equally divided in the vertical direction and how many regions the ROI is equally divided in the horizontal direction. Note that, the divided region setting unit 128 may set the divided regions on the basis of the user's input, or may set the divided regions on the basis of a predetermined condition. In the embodiment, it is assumed that the ROI is divided into 5×5 regions.

Next, in step S14, the GP learning control unit 121 reads a learning image from the storage unit 150. In this case, for example, the GP learning control unit 121 reads an OK image or an NG image from the storage unit 150 as one learning image.

Next, in step S16, the GP learning control unit 121 acquires quality accuracy data. In this case, the GP learning control unit 121 acquires the quality accuracy data (information on whether the image is the OK image or the NG image) from the label added to the learning image.

Next, in step S18, the NG region input unit 127 acquires data of an NG region. In this case, the NG region input unit 127 acquires data of the NG region as teaching data on the basis of an input from the user, and inputs the acquired data to the NG region index calculation unit 129.

Next, in step S20, the NG region index calculation unit 129 indexes the NG region. In other words, the NG region index calculation unit 129 generates NG teaching region data (NG teaching region index) as illustrated in FIG. 4D.

Next, in step S22, the GP learning control unit 121 determines whether or not the learning image stored in the storage unit 150 has ended, in other words, whether or not all the learning images have been read. In a case where the determination in step S22 is negative, the processing returns to step S14, and the processing in steps S14 to S22 is executed as the processing for the next learning image. On the other hand, in a case where the determination in step S22 is positive, the processing proceeds to step S24.

Next, in step S24, the GP learning control unit 121 randomly selects two parent individuals from the individuals included in the individual group.

Next, in step S26, the GP learning control unit 121 generates a predetermined number (two or more) of child individuals by using the selected parent individuals. For example, the GP learning control unit 121 generates the predetermined number (two or more) of child individuals by performing crossover between the two selected parent individuals. Furthermore, the GP learning control unit 121 generates a mutation in any node of each generated child individual, and changes the element of the node.

Next, in step S27, the GP learning control unit 121 selects one of the generated child individuals.

Next, in step S28, an evolution stage processing subroutine is executed. In the evolution stage processing subroutine, the processing is executed along the flowcharts of FIGS. 10 and 11.

Figure 10:
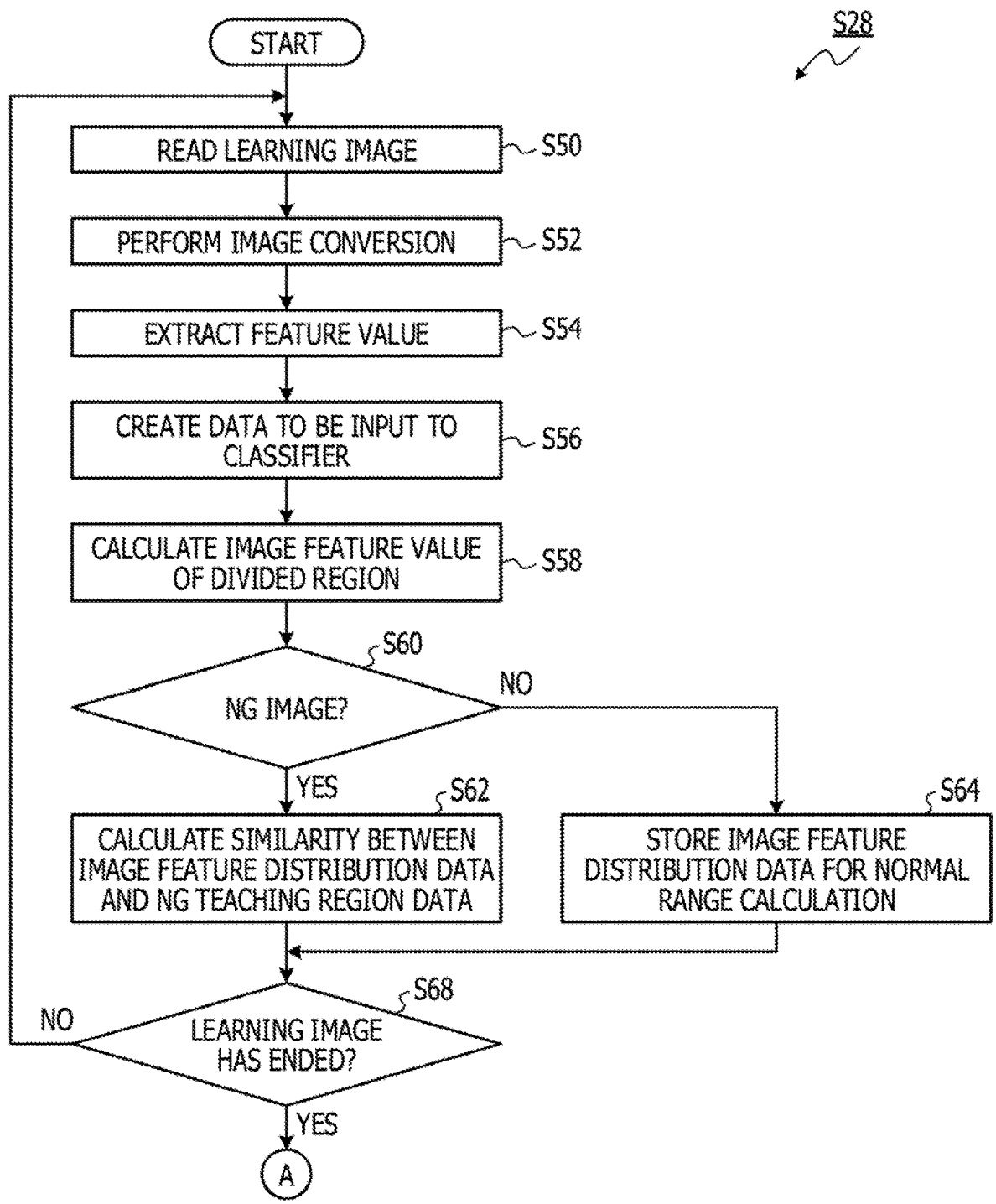
FIG. 10 is a flowchart (part 1) illustrating specific processing in step S28 of FIG. 9.
Figure 11:
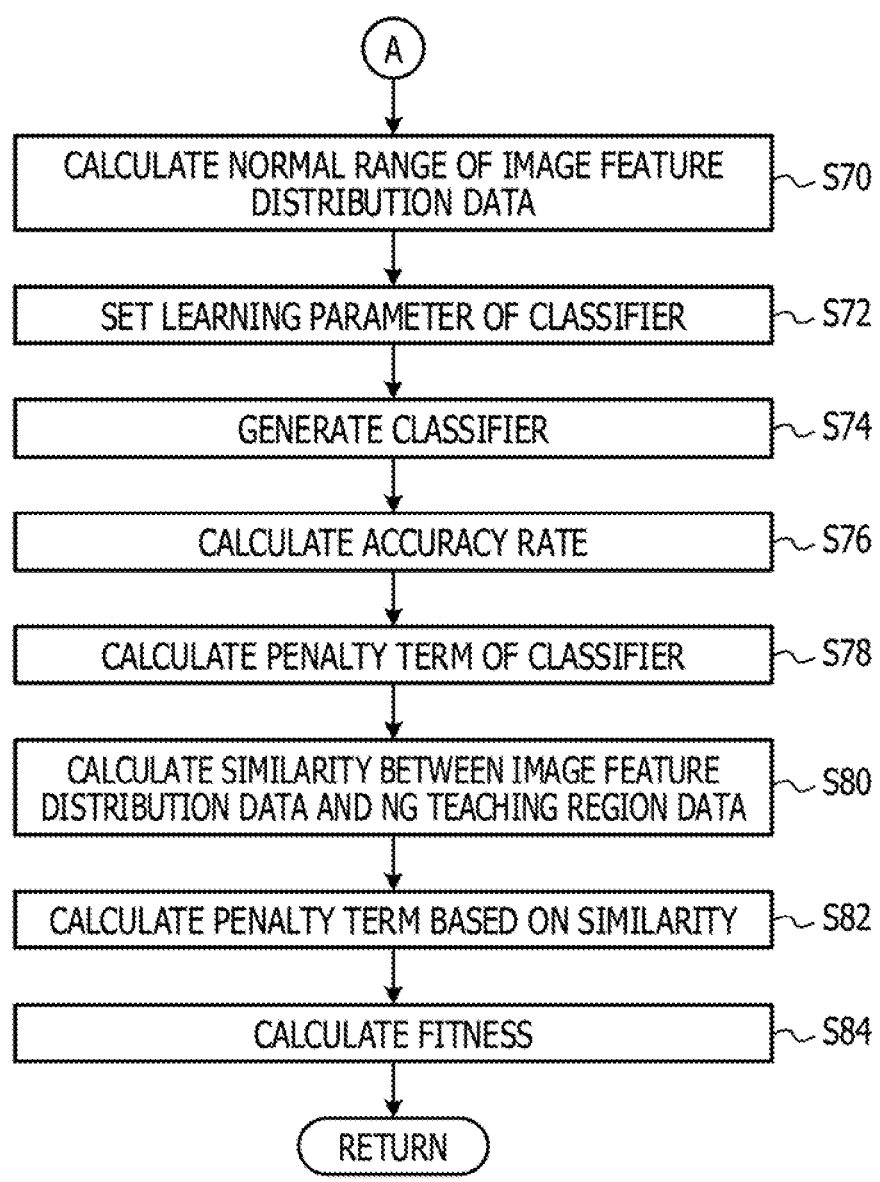
FIG. 11 is a flowchart (part 2) illustrating the specific processing in step S28 of FIG. 9.

In the processing in FIGS. 10 and 11, first, in step 50, the GP learning control unit 121 reads a learning image from the storage unit 150.

Next, in step S52, the image conversion unit 122 performs image conversion on the learning image read in step S50 by using the selected child individual. Next, in step S54, the image feature value extraction unit 123 extracts an image feature value on the basis of the converted image.

Figure 13:
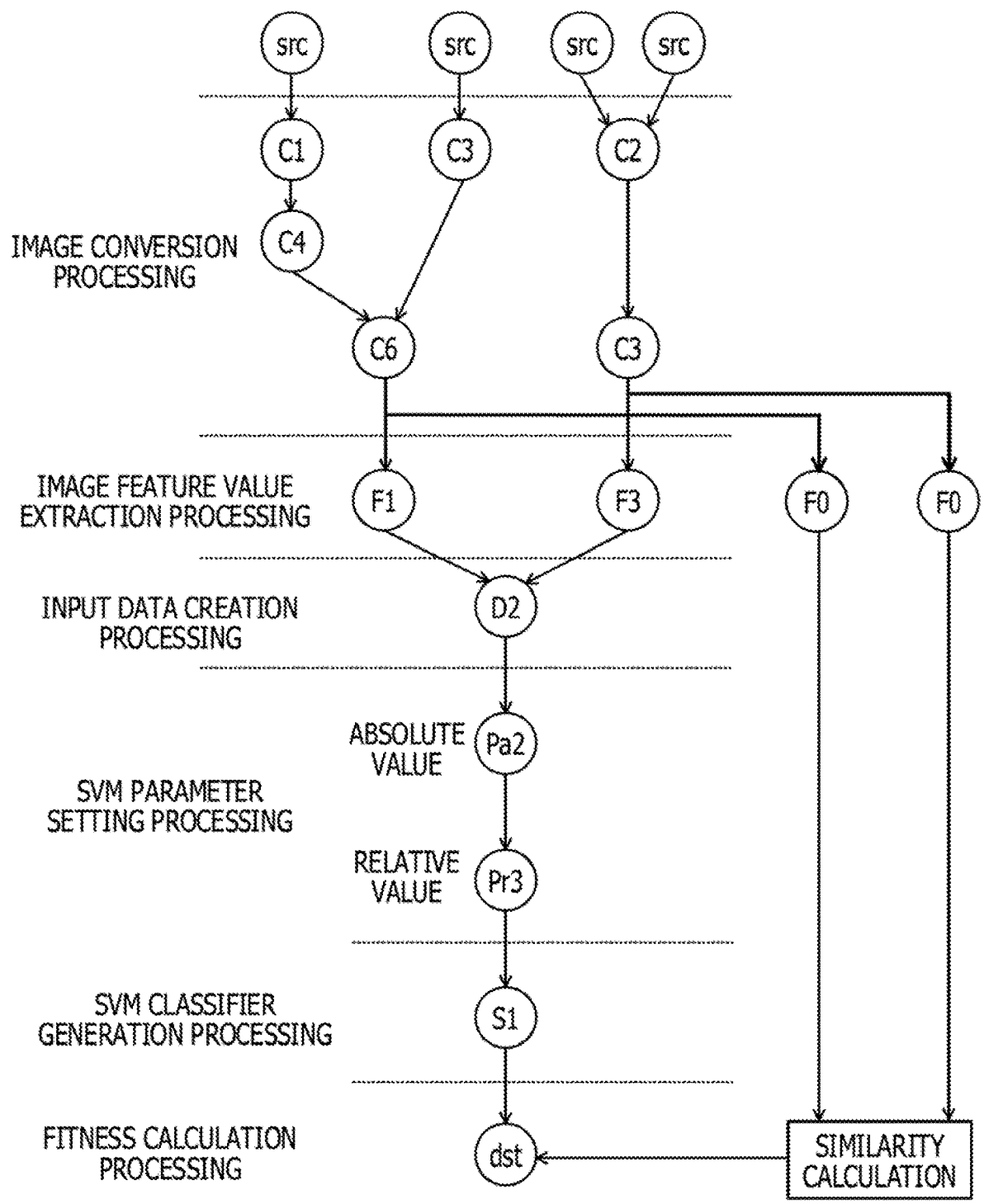
FIG. 13 is a diagram for explaining a filter for extracting an image feature value used for generating image feature distribution data (image feature distribution index) in the first embodiment.

Here, in the first embodiment, as illustrated in FIG. 13, the image feature value is extracted by using a filter (F0) different from the filters (F1, F3 in FIG. 13) set in the image feature value extraction processing in the child individual. Note that, the filter F0 is a common (fixed) filter in each child individual. In other words, the filters F1 and F3 gradually change while performing learning by crossover or mutation, but the filter F0 does not change. Note that, an input to the filter F0 is a feature extraction image converted by the image conversion processing, and is the same image as the feature extraction image input to the SVM classifier.

Next, in step S56, the input data creation unit 124 generates input data to be input to the classifier on the basis of the child individual. Next, in step S58, the divided region feature value extraction unit 130 calculates an image feature value of each of the divided regions, and generates image feature distribution data (image feature distribution index) as illustrated in FIG. 4E.

Next, in step S60, the similarity calculation unit 131 determines whether or not the learning image is the NG image. In a case where the determination in step S60 is positive, the processing proceeds to step S62, and in a case where the determination is negative, the processing proceeds to step S64.

When the determination in step S60 is positive and the processing proceeds to step S62, the similarity calculation unit 131 reads image feature distribution data (image feature distribution index) corresponding to the currently read learning image from the storage unit 150, and calculates a similarity with the NG teaching region data (NG teaching region index) generated in step S56. Note that, the similarity calculation unit 131 stores the calculated similarity in the storage unit 150. Thereafter, the processing proceeds to step S66.

On the other hand, when the determination in step S60 is negative and the processing proceeds to step S64, the image feature value extraction unit 123 stores the image feature distribution data (image feature distribution index) as illustrated in FIG. 7B for normal range calculation, in the storage unit 150. After step S64, the processing proceeds to step S66.

In step S66, the GP learning control unit 121 determines whether or not the learning image has ended, in other words, whether or not all the learning images have been read in step S50. In a case where the determination in step S66 is negative, the processing returns to step S50, and the processing and determination in steps S50 to S66 are repeated until the determination in step S66 becomes positive. On the other hand, when the determination in step S66 is positive, the processing proceeds to step S70 of FIG. 11.

When the processing proceeds to step S70 of FIG. 11, the image feature value extraction unit 123 calculates a normal range of the image feature distribution data. Specifically, the image feature value extraction unit 123 acquires the multiple image feature distribution data (FIG. 7B) for normal range calculation from the storage unit 150, and calculates basic statistics (such as average and standard deviation) to obtain the normal range of the image feature distribution data. Note that, the normal range of the image feature distribution data can be said to be third data indicating the image feature value of each of the divided regions calculated from the image obtained by image conversion on the OK image.

Next, in step S72, the classifier parameter setting unit 125 sets a learning parameter of the classifier. Next, in step S74, the classifier generation unit 126 generates the classifier.

Next, in step S76, the GP learning control unit 121 calculates an accuracy rate. In other words, it is determined whether each learning image is the NG image or the OK image by using, for example, a cross-validation method, and the accuracy rate is calculated as a ratio at which the determination result matches the label indicating quality added to each learning image. Next, in step S78, the GP learning control unit 121 calculates a penalty term of the classifier.

Next, in step S80, the similarity calculation unit 131 calculates a similarity (overall similarity) between the image feature distribution data and the NG teaching region data in the manner described above. Next, in step S82, the fitness calculation unit 132 calculates a penalty term based on the calculated similarity (overall similarity). Then, in step S84, the fitness calculation unit 132 calculates a fitness on the basis of the above equation (1).

The processing in FIGS. 10 and 11 (processing in step S28) is performed as described above, and then the processing proceeds to step S30 of FIG. 9. In step S30, the GP learning control unit 121 determines whether or not all the generated child individuals have been selected. In a case where the determination in step S30 is negative, the processing returns to step S26, and steps S27 to S30 are repeatedly executed to execute the processing in step S28 on all the generated child individuals. On the other hand, in a case where the determination in step S30 is positive, the processing proceeds to step S32.

When the processing proceeds to step S32, the GP learning control unit 121 selects, from among the child individuals generated in step S26, a child individual having the highest fitness as a child individual to be caused to exist. Moreover, the GP learning control unit 121 selects one more individual to be caused to exist from the remaining child individuals. In this selection processing, for example, an individual is selected with a probability depending on the fitness. The GP learning control unit 121 replaces the parent individuals selected in step S24 with two individuals to be caused to exist. In other words, it can be said that, in step S32, the GP learning control unit 121 uses the fitness of the child individual based on the similarity between the NG teaching region data (NG teaching region index) and the image feature distribution data (image feature distribution index) for genetic programming.

Next, in step S34, the GP learning control unit 121 determines whether or not the maximum fitness of the parent individual is greater than a threshold value. In a case where the determination in step S34 is negative, the processing returns to step S24, but in a case where the determination is positive, the processing proceeds to step S36. When the processing proceeds to step S36, the GP learning control unit 121 stores the best individual, in other words, an individual having the highest fitness in the storage unit 150. This individual also includes classifier information indicating the classifier generated in the processing in step S28.

With the above processing, the learning processing ends.

(Processing in the Image Inspection Processing Unit 112)

Next, along the flowchart of FIG. 12, processing will be described in the image inspection processing unit 112 using the individual (best individual) obtained by the learning processing.

Figure 12:
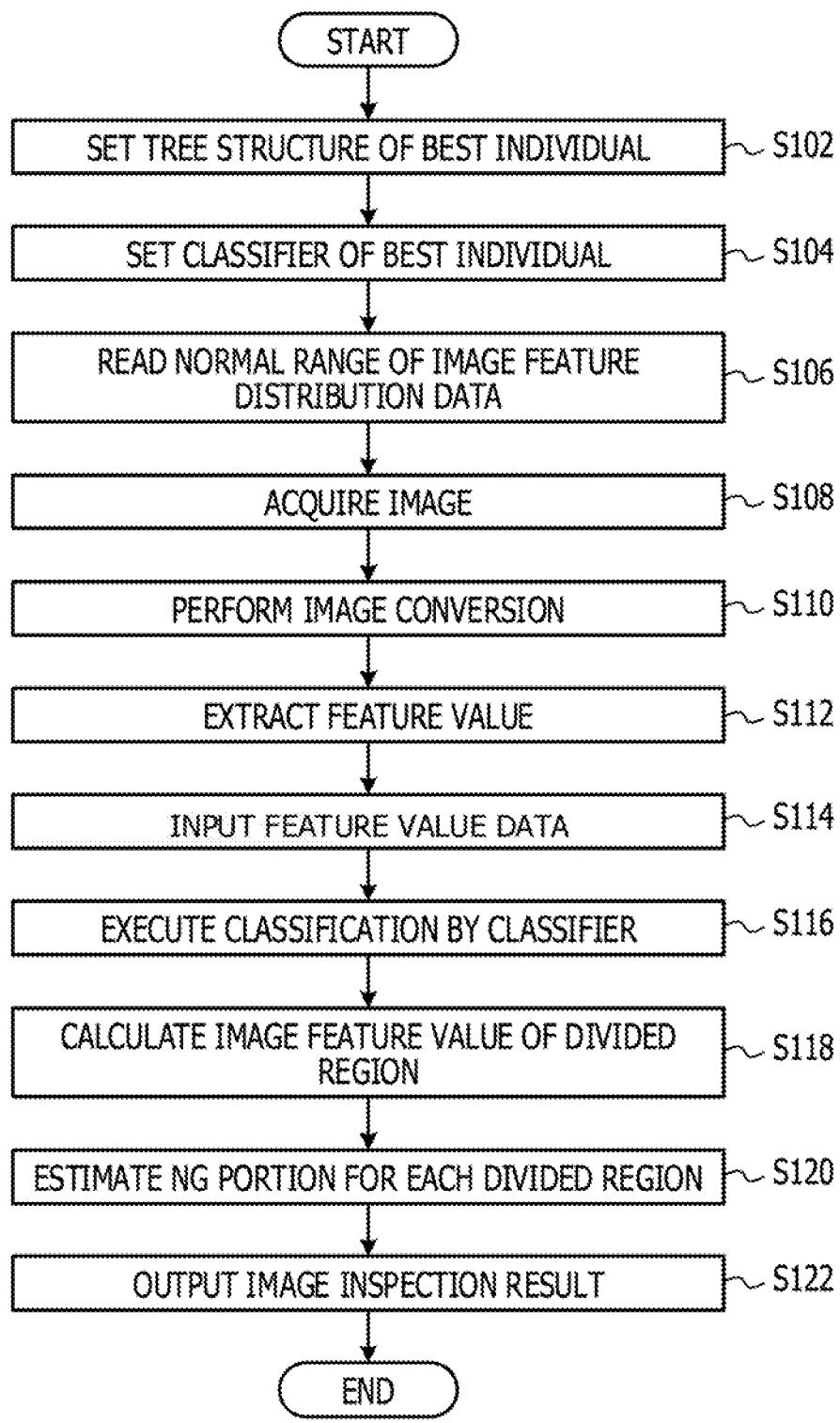
FIG. 12 is a flowchart illustrating an example of a processing procedure of an image inspection processing unit.

In the processing in FIG. 12, first, in step S102, the image inspection processing unit 112 reads information on the best individual from the storage unit 150, and sets the tree structure of the best individual as a tree structure used for image inspection on the basis of the read information.

Next, in step S104, the image inspection processing unit 112 sets the classifier of the best individual as a classifier used for the image inspection on the basis of the read information on the best individual.

Next, in step S106, the image inspection processing unit 112 reads the normal range of the image feature distribution data from the storage unit 150. Note that, the normal range of the image feature distribution data read here is the data calculated in step S70.

Next, in step S108, the image inspection processing unit 112 acquires an image to be inspected via the image input unit 111. The image is, for example, an image captured by the camera 107a.

Next, in step S110, the image inspection processing unit 112 performs image conversion on the image to be inspected by using the image conversion filter set in step S102. Furthermore, in step S112, the image inspection processing unit 112 extracts the feature value of the converted image in accordance with the set feature extraction filter. Moreover, in step S114, the image inspection processing unit 112 inputs the feature value data to the classifier. Then, in step S116, the image inspection processing unit 112 executes classification by the classifier. In other words, the image inspection processing unit 112 classifies the converted image into the OK image or the NG image.

Next, in step S118, the image inspection processing unit 112 calculates the image feature value of the divided region. Next, in step S120, the image inspection processing unit 112 estimates an NG portion for each of the divided regions. In other words, the image inspection processing unit 112 obtains an abnormality score for each of the divided regions as illustrated in FIG. 7E, and estimates a divided region where the abnormality score exceeds a predetermined threshold value, as an NG portion. Note that, the processing in step S120 can be said to be processing of determining normality or abnormality of each of the divided regions of the image to be inspected.

Thereafter, in step S122, the image inspection processing unit 112 outputs an image inspection result on the display device 104a. In the image inspection result, in addition to a quality determination result (OK image or NG image), information is also included on the NG portion estimated in step S120 (image to be inspected with the NG portion overlaid as illustrated in FIG. 7F).

When the processing up to step S122 is completed as described above, the entire processing in FIG. 12 is ended.

Specific Example

Figure 15:
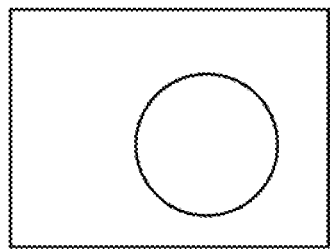
FIG. 15 is a diagram (part 2) for explaining the results of performing learning and quality determination for the pseudo NG images.
Figure 15:
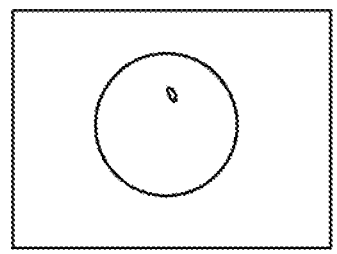
Figure 15:
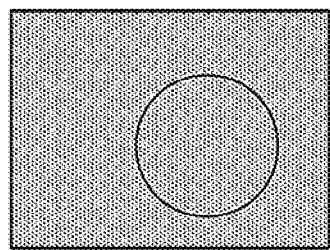
Figure 15:
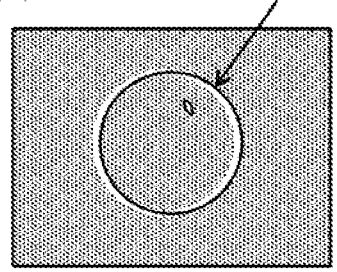
Figure 15:
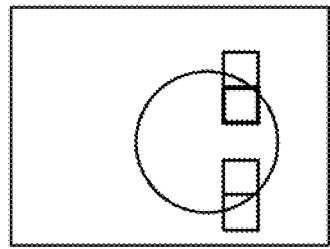
Figure 15:
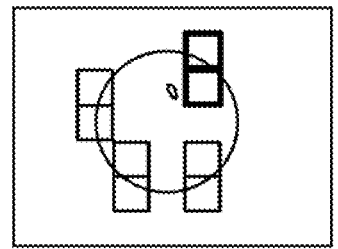
Figure 16:
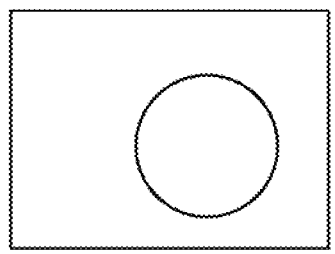
FIG. 16 is a diagram (part 3) for explaining the results of performing learning and quality determination on the pseudo NG images.
Figure 16:
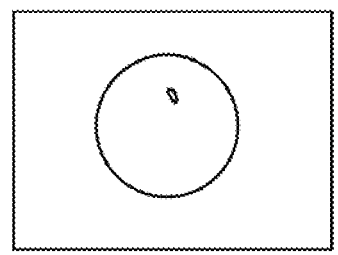
Figure 16:
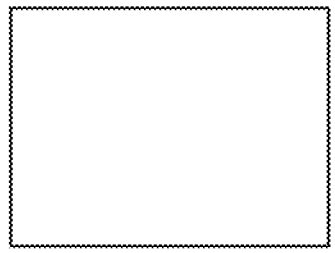
Figure 16:
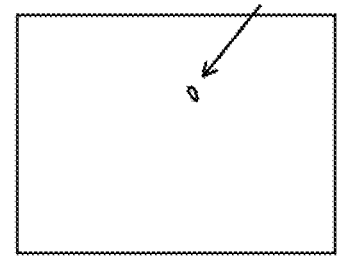
Figure 16:
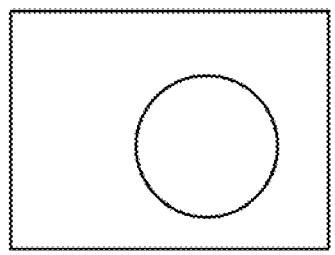
Figure 16:
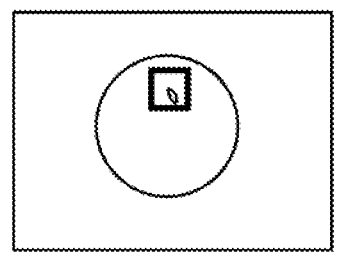

FIGS. 14 to 16 illustrate results of performing learning and quality determination for pseudo NG images. In this example, as illustrated in FIG. 14A, learning has been performed with 40 learning images (20 OK images, 20 NG images), and determination accuracy has been examined with 160 unknown evaluation images (80 OK images, 80 NG images).

FIG. 14B illustrates an example of the OK image of the learning image, and FIG. 14C illustrates examples of the NG image of the learning image. Similar to FIG. 4A, the NG image is a test image in which an ellipse that is a dent or a foreign object is drawn on the surface of a circular object.

For the NG image, the user taught the NG region with a rectangle as illustrated in FIG. 14B. Furthermore, the number of divided regions of the ROI was 5×5.

FIG. 14D illustrates quality determination results (accuracy rates) in a case where the NG region has not been taught, only a correct answer of OK or NG has been taught, and learning has been performed, and FIG. 14E illustrates quality determination results (accuracy rates) in a case where the NG region and the correct answer of OK or NG have been taught, and learning has been performed. Note that, FIGS. 14D and 14E illustrate results of performing the quality determination on the evaluation images, including learning results in the early learning stage and the middle learning stage. Note that, the smaller generation number means the early learning stage, and the larger generation number means the final learning stage.

From FIGS. 14D and 14E, the learning with teaching of the NG region (FIG. 14E) can increase the final accuracy rate, and also the accuracy rate 100% is reached at an early stage, so that it can be seen that the learning time can be shortened.

FIG. 15 is a diagram illustrating a result of performing estimation of the NG portion on each of the OK image and the NG image in the final generation (the 400th generation) in a case where the NG region is not taught. Furthermore, FIG. 16 is a diagram illustrating a result of performing estimation of the NG portion on each of the OK image and the NG image in the final generation (the 268th generation) in a case where the NG region is taught. Note that, the NG images in FIGS. 15 and 16 are NG images that are determined to be OK images (erroneously determined) in the case without NG region teaching, and determined to be NG images in the case with NG region teaching.

As can be seen by comparing the middle part of FIG. 15 and the middle part of FIG. 16, in a case where the NG region has not been taught and learning has been performed, an outer diameter portion of the object irrelevant to the determination has been extracted as a feature portion in the feature extraction image, and in a case where the NG region has been taught and learning has been performed, the feature portion can be extracted limited to the NG portion.

Furthermore, as can be seen by comparing the lower part of FIG. 15 and the lower part of FIG. 16, in the case where the NG region has been taught and learning has been performed (FIG. 16), only a portion where a scratch or a foreign object exists can be estimated as the NG portion, but in the case where the NG region has not been taught and learning has been performed (FIG. 15), the portion where the scratch or the foreign object exists cannot be estimated as the NG portion, and a portion other than the portion where the scratch or the foreign object exists has been estimated as the NG portion. Note that, in the lower part of FIG. 15 and the lower part of FIG. 16, it means that the thicker the line of the white line rectangle, the larger the abnormality score.

As described above, it has been confirmed that the accuracy of the quality determination is higher, and the estimation of the NG portion is more accurate in a case where the NG region is taught, and learning is performed.

As described above in detail, according to the first embodiment, when automatically generating the image classification program on the basis of genetic programming, the image classification device 100 accepts the input of the NG region of the learning image (S18), and creates the NG teaching region data (NG teaching region index) indicating the degree of overlap between the NG region and each of the divided regions obtained by dividing the learning image (ROI) (S20). Furthermore, the image classification device 100 performs image conversion on the learning image by a predetermined image classification program (child individual), calculates the image feature value of each of the divided regions from the obtained image, and creates the image feature distribution data (image feature distribution index) corresponding to each of the divided regions (S58). Then, the image classification device 100 calculates the similarity between the NG teaching region data (NG teaching region index) and the image feature distribution data (image feature distribution index) (S80), and uses the result (fitness) of evaluating the image classification program (child individual) on the basis of the similarity for execution of the genetic programming (S82, S84). Therefore, in the first embodiment, it is possible to preferentially learn image conversion processing in which a difference appears prominently in the taught NG region, so that a learning result (image classification program) based on a true NG portion can be obtained, and learning speed can be increased.

Furthermore, determination accuracy can be improved by performing quality determination on the image on the basis of the learning result.

Furthermore, in the first embodiment, the image classification device 100 uses the image classification program automatically generated to perform image conversion on a learning image in which all the divided regions are normal, and calculates the normal range of the image feature value distribution data from the obtained image (S106), and estimates the NG portion of the image to be inspected on the basis of the comparison result between the normal range and the image feature distribution data of the image to be inspected (S120). Therefore, the NG portion in the image to be inspected can be estimated with high accuracy for each of the divided regions. Furthermore, since the region division and the method for calculating the image feature distribution data are the same as those at the time of learning, the calculation cost and the like can be suppressed.

Furthermore, in the first embodiment, since the NG region specified by the user is a simple shape such as a rectangle, a circle, or an ellipse, the burden of teaching work can be reduced and the calculation of indexing of the NG region can be simplified.

Second Embodiment

Hereinafter, a second embodiment will be described with reference to FIGS. 17 to 19.

Figure 17:
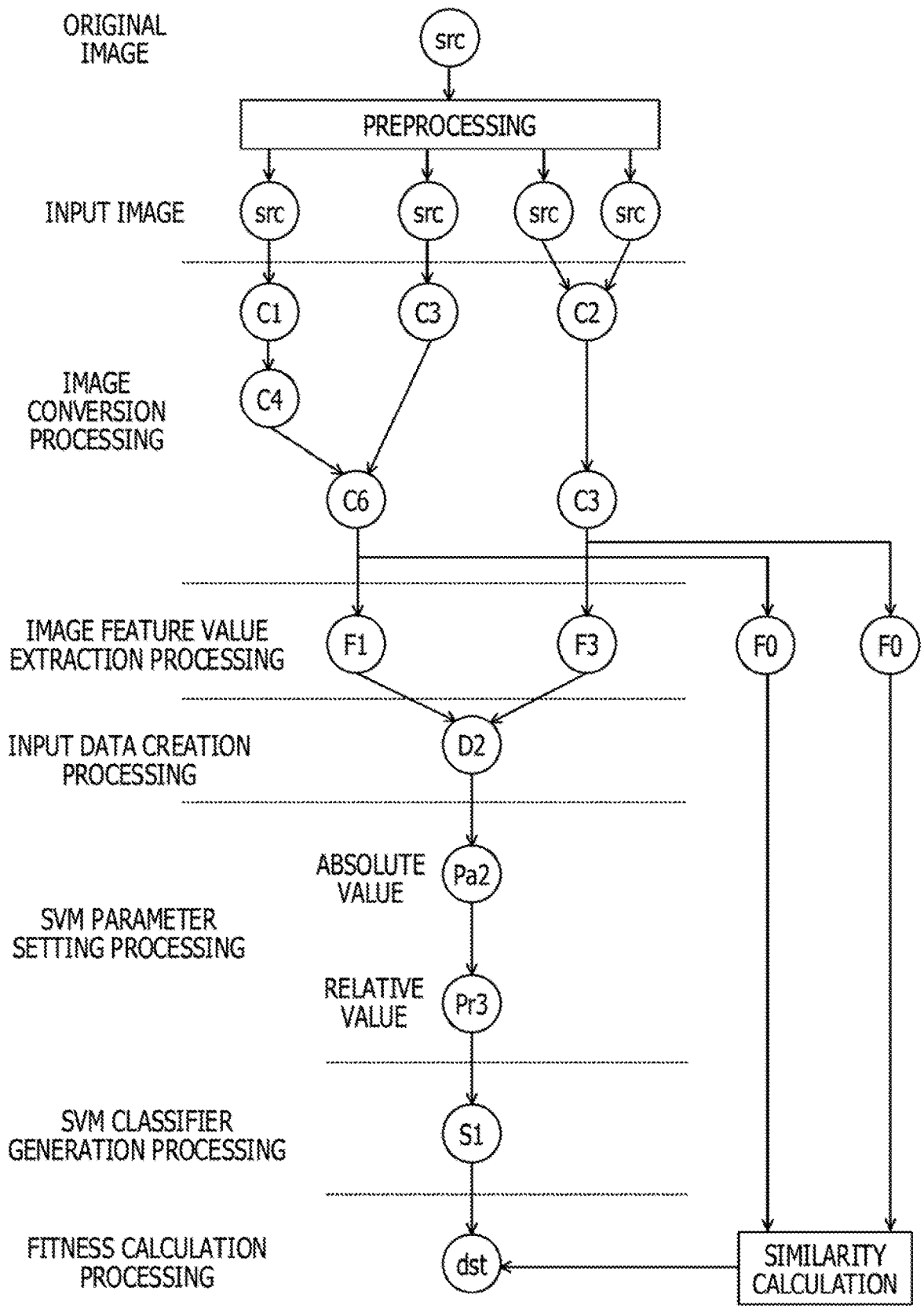
FIG. 17 is a diagram illustrating an outline of a second embodiment.

In the first embodiment described above, the original image is directly input to the tree structure filter sequence as the learning image; however, in the second embodiment, as illustrated in FIG. 17, preprocessing is performed on the original image, and the image subjected to the preprocessing is input as the learning image.

The preprocessing on the input image is processing of suppressing variation in average luminance of the entire image for the original image, and is, for example, average difference processing or normalization processing for each image. Here, the average difference processing is processing of adjusting the average luminance, and the normalization processing is processing of performing the average difference processing and then performing division by the luminance variation. In a case where the average luminance of the entire image varies, it is effective to perform the average difference processing and the normalization processing for each image.

Furthermore, as the preprocessing on the input image, for example, not for each image, the average difference processing or the normalization processing may be performed using an average image of the entire OK image at the time of learning. In a case where an average difference image is created by using the average image of the entire OK image, the image feature value can be obtained as a change amount from the normal distribution even if the feature extraction is performed without converting the input image at all. The similarity between the NG region and the image feature value can therefore be increased even with simple image conversion.

Figure 18A:
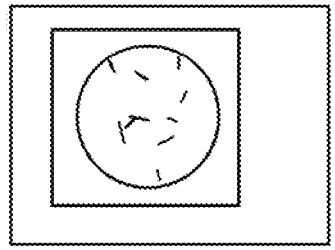

FIG. 18 illustrates results of testing learning and quality determination according to the second embodiment. As illustrated in FIG. 18A, the original image used in this test is an image in which a scratch defect has occurred on the surface of a circular part, and since there are many small scratches even if the image is the OK image, only a line segment having greater than or equal to a predetermined length or thickness is treated as NG.

Figure 18B:
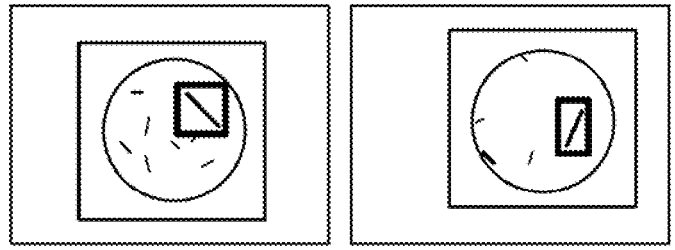
Figure 18C:
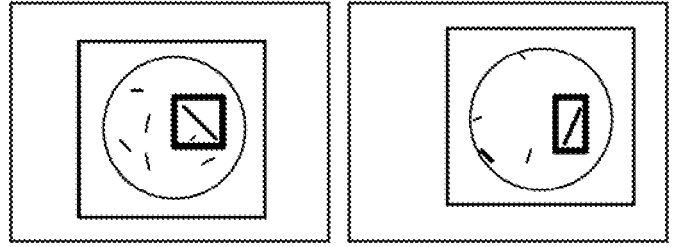

FIG. 18B illustrates examples in which an NG region is taught for an NG image. Furthermore, FIG. 18C illustrates input images obtained as a result of performing preprocessing on the original images of FIG. 18B. In this test, as the preprocessing, processing has been adopted in which the average luminance is adjusted for each image, and then the difference from the average image of the entire OK image is taken. Note that, since the difference from the average image of the entire OK image is obtained as an absolute value, conversion is performed such that, the difference is zero when the original image matches the average image, and a pixel brighter than the average luminance and a pixel darker than the average luminance both have a luminance value greater than or equal to zero.

FIGS. 18D and 18E illustrate results of comparing quality determinations of 160 evaluation images by using 40 learning images and performing learning both with and without teaching of the NG region from the same initial individual, as in the first embodiment (FIG. 14A). As illustrated in FIGS. 18D and 18E, it has been found that higher accuracy can be obtained by learning with teaching of the NG region in both average determination accuracy and final determination accuracy.

Figure 19:
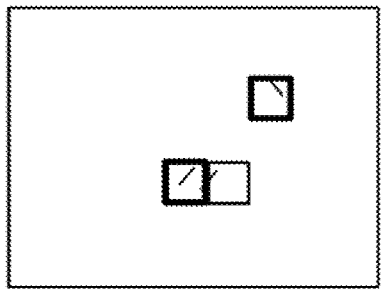
FIG. 19 is a diagram illustrating estimation results of NG portions in a case where NG regions are taught in the second embodiment.
Figure 19:
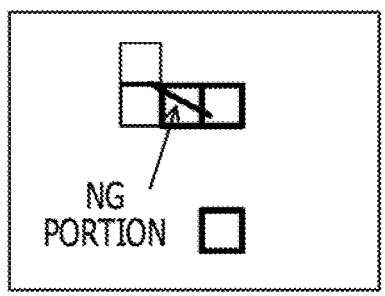
Figure 19:
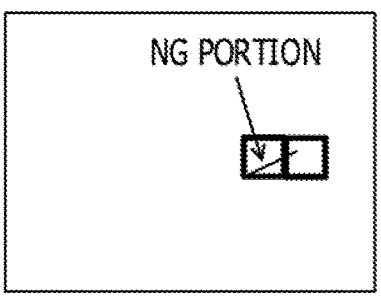
Figure 19:
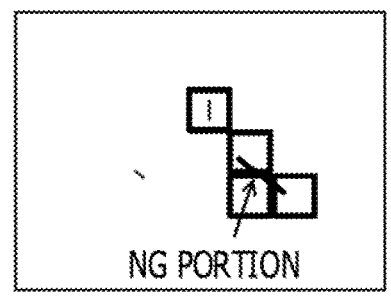

FIG. 19 illustrates estimation results of NG portions in a case where NG regions are taught. In this test, since small scratches and the like slightly exist even in the OK image, a slightly larger number of NG portions are estimated in both the OK image and the NG image, but it has been found that the NG portions are correctly estimated in the NG images.

Third Embodiment

Next, a third embodiment will be described with reference to FIG. 20.

Figure 20:
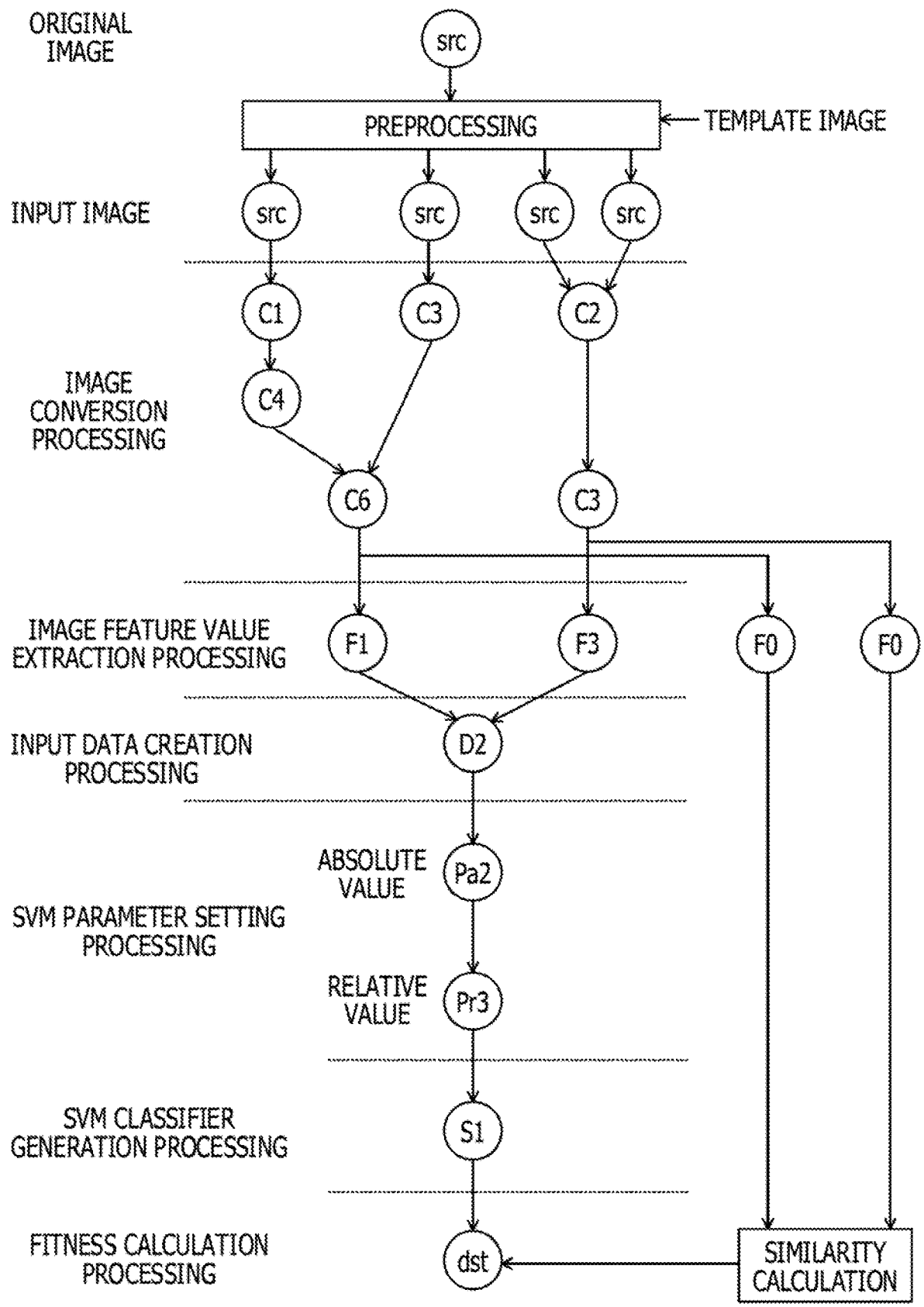
FIG. 20 is a diagram for explaining a third embodiment.

In the third embodiment, as illustrated in FIG. 20, preprocessing of automatically performing alignment is executed on an original image, and the image subjected to the preprocessing is used as an input image.

In other words, in the third embodiment, an image of an object is given as a template image, and in the preprocessing, the GP learning control unit 121 sets a position searched by template matching on the original image as an ROI. Then, the processing similar to that of the first embodiment is executed using an image in which the ROI is set, as an input image. By doing so, for example, in appearance inspection of an actual production line and the like, it becomes possible to automatically set the ROI correctly coping with the positional deviation of the object, and the like.

Note that, an average image of OK images created at the time of learning may be stored as a template image, and the ROI may be set by using the template image at the time of quality determination.

Note that, in the third embodiment, the GP learning control unit 121 functions as an extraction unit that extracts the ROI from the original image by template matching using the original image and the template image.

Fourth Embodiment

In the first embodiment, and the second and third embodiments described above, a filter independent of the tree structure filter sequence is prepared as the feature extraction filter (filter F0 in FIG. 13) used when the image feature value of each region is calculated. On the other hand, in a fourth embodiment, the function of the filter F0 is incorporated in the tree structure filter sequence.

Figure 21:
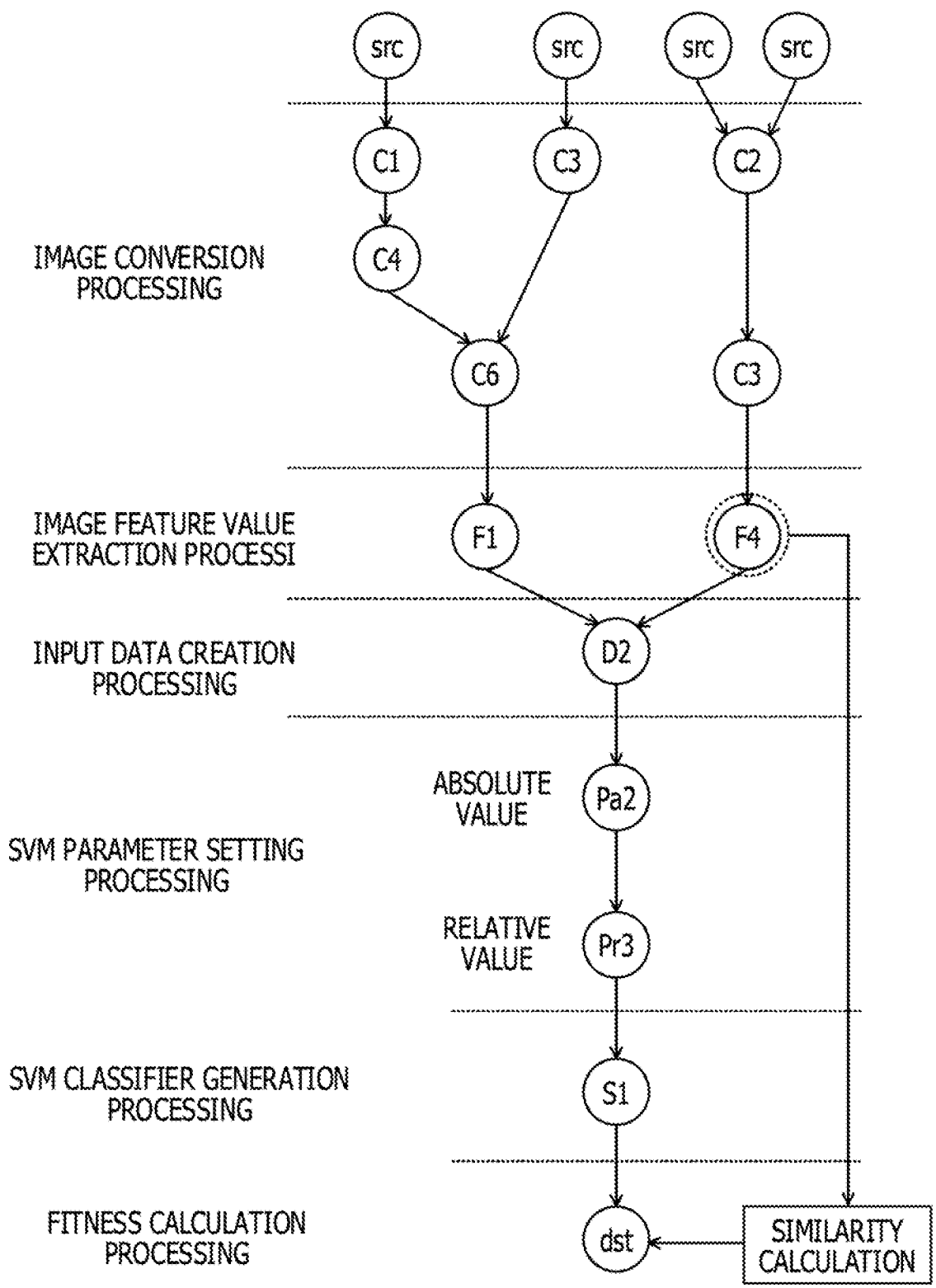
FIG. 21 is a diagram for explaining a fourth embodiment.

FIG. 21 illustrates a tree structure filter sequence according to the fourth embodiment. In the fourth embodiment, a plurality of filters is prepared that extracts feature values of divided regions, and any of the prepared filters is used as a filter indicated by a dotted circle in FIG. 21 (in FIG. 21, a filter F4 is used).

Note that, the image feature extraction filter (F4) may be changed by mutation while performing learning similarly to a normal filter, or may be fixed by a single filter. In any case, an output of the feature extraction filter is used as an image feature value in calculation of the similarity with the NG teaching region, and also used as an image feature value in generation of the SVM classifier.

(Modifications)

Hereinafter, modifications will be described.

(1) Image Feature Value in Divided Region

In the processing such as FIG. 4E, the image feature value of each of the divided regions is extracted, and as the image feature value, it is possible to use the average luminance, luminance variation, luminance range in each of the divided regions, or a combination thereof.

(2) Similarity Calculation Between NG Teaching Region Data and Image Feature Value Distribution Data In a case where the similarity is calculated on the basis of data such as FIGS. 4D and 4E, in addition to the normalized correlation value and the cosine similarity described above, various calculations for obtaining a distance between vectors can be used, such as the sum of squared differences, and the sum of absolute differences. Note that, it is necessary to adjust the way of reflection in the fitness depending on the kind of calculation.

Note that, the processing functions described above can be implemented by a computer. In that case, a program is provided in which processing content of a function to be included in a processing device is written. The processing functions described above are implemented on the computer by executing the program on the computer. The program in which the processing content is written can be recorded in a computer-readable recording medium (except for a carrier wave).

In the case of distributing the program, for example, the program is sold in the form of a portable recording medium such as a digital versatile disc (DVD) or a compact disc read only memory (CD-ROM) in which the program is recorded. Furthermore, it is also possible to store the program in a storage device of a server computer and transfer the program from the server computer to another computer via a network.

The computer that executes the program stores, for example, the program recorded in the portable recording medium or the program transferred from the server computer in a storage device of the computer. Then, the computer reads the program from the storage device of the computer and executes processing according to the program. Note that, the computer can directly read the program from the portable recording medium and execute processing according to the program. Furthermore, the computer also can sequentially execute processing according to the received program each time when the program is transferred from the server computer.

The embodiments described above are preferred examples of carrying out the present invention. However, the present invention is not limited to these examples, and a variety of modifications can be made without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
accept specification of a feature region that includes a characteristic portion in a learning image;
create first data that indicates a degree of overlap between the feature region and each of divided regions obtained by dividing the learning image;
perform image conversion on the learning image by an image classification program in which element filters are combined;
calculate an image feature value of each of the divided regions from an image obtained;
create second data that indicates the image feature value corresponding to each of the divided regions;
calculate a similarity between the first data and the second data; and
use a result of evaluating the image classification program on the basis of the similarity, for execution of a genetic programming.

2. The information processing device according to claim 1, wherein the processor is configured to:
use the image classification program automatically generated to perform image conversion on a normal image;
calculate an image feature value of each of the divided regions from an image obtained;
create third data that indicates the image feature value corresponding to each of the divided regions; and
determine whether each of the divided regions of an image to be processed is normal or abnormal based on a comparison result between the third data and an image feature value of each of the divided regions of the image to be processed.

3. The information processing device according to claim 1, wherein the feature region is a rectangular, circular, or elliptical region.

4. The information processing device according to claim 1, wherein the processor is configured to perform correction such that a fitness that indicates a level of evaluation of the image classification program becomes higher as the similarity is higher.

5. The information processing device according to claim 1, wherein the learning image is an image after preprocessing of suppressing variation in average luminance of the entire image is executed on an original image.

6. The information processing device according to claim 1, wherein
the learning image is a part of an original image, and
the processor is configured to extract the learning image from the original image by template matching using the original image and a template image prepared in advance.

7. The information processing device according to claim 1, wherein a feature value filter used when the processor calculates an image feature value of each of the divided regions is a predetermined feature value filter.

8. The information processing device according to claim 1, wherein a feature value filter used when the processor calculates an image feature value of each of the divided regions is changed depending on processing of generating the image classification program by the genetic programming.

9. A non-transitory computer-readable recording medium recording an information processing program causing a computer to execute processing of:
accepting specification of a feature region that includes a characteristic portion in a learning image;
creating first data that indicates a degree of overlap between the feature region and each of divided regions obtained by dividing the learning image;
performing image conversion on the learning image by an image classification program in which element filters are combined;
calculating an image feature value of each of the divided regions from an image obtained;
creating second data that indicates the image feature value corresponding to each of the divided regions;
calculating a similarity between the first data and the second data; and
using a result of evaluating the image classification program on the basis of the similarity, for execution of the genetic programming.

10. The non-transitory computer-readable recording medium according to claim 9, further comprising:
using the image classification program automatically generated to perform image conversion on a normal image;
calculating an image feature value of each of the divided regions from an image obtained;
creating third data that indicates the image feature value corresponding to each of the divided regions; and
determining whether each of the divided regions of an image to be processed is normal or abnormal on the basis of a comparison result between the third data and an image feature value of each of the divided regions of the image to be processed.

11. The non-transitory computer-readable recording medium according to claim 9, wherein the feature region is a rectangular, circular, or elliptical region.

12. The non-transitory computer-readable recording medium according to claim 9, wherein, in the processing of using, correction is performed such that a fitness that indicates a level of evaluation of the image classification program becomes higher as the similarity is higher.

13. The non-transitory computer-readable recording medium according to claim 9, wherein the learning image is an image after preprocessing of suppressing variation in average luminance of the entire image is executed on an original image.

14. The non-transitory computer-readable recording medium according to claim 9, wherein
the learning image is a part of an original image, and
the learning image is extracted from the original image by template matching using the original image and a template image prepared in advance.

15. The non-transitory computer-readable recording medium according to of claim 9, wherein a feature value filter used when an image feature value of each of the divided regions is calculated in the processing of creating the second data is a predetermined feature value filter.

16. The non-transitory computer-readable recording medium according to claim 9, wherein a feature value filter used when an image feature value of each of the divided regions is calculated in the processing of creating the second data is changed depending on processing of generating the image classification program by the genetic programming.

17. An information processing method comprising:
accepting, by a computer, specification of a feature region that includes a characteristic portion in a learning image;
creating first data that indicates a degree of overlap between the feature region and each of divided regions obtained by dividing the learning image;
performing image conversion on the learning image by an image classification program in which element filters are combined;
calculating an image feature value of each of the divided regions from an image obtained;
creating second data that indicates the image feature value corresponding to each of the divided regions;
calculating a similarity between the first data and the second data; and
using a result of evaluating the image classification program on the basis of the similarity, for execution of the genetic programming.

\* \* \* \* \*